(12) United States Patent
Luo et al.

(10) Patent No.: US 12,309,539 B2
(45) Date of Patent: May 20, 2025

(54) TERMINAL PROTECTIVE CASE AND AUDIO PLAYBACK SYSTEM

(71) Applicant: Huawei Technologies Co., Ltd., Shenzhen (CN)

(72) Inventors: Junqing Luo, Shanghai (CN); Jie Su, Shenzhen (CN); Ligang Yu, Shenzhen (CN); Fanfan Liu, Shanghai (CN); Jing Chang, Shanghai (CN); Shizhe Li, Shanghai (CN); Senjun Chen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 302 days.

(21) Appl. No.: 17/802,690

(22) PCT Filed: Jan. 28, 2021

(86) PCT No.: PCT/CN2021/074057
§ 371 (c)(1),
(2) Date: Aug. 26, 2022

(87) PCT Pub. No.: WO2021/169719
PCT Pub. Date: Sep. 2, 2021

(65) Prior Publication Data
US 2023/0141955 A1 May 11, 2023

(30) Foreign Application Priority Data
Feb. 28, 2020 (CN) .......................... 202010130959.2

(51) Int. Cl.
*H04R 1/02* (2006.01)
*A45C 11/00* (2006.01)
*H04R 17/00* (2006.01)

(52) U.S. Cl.
CPC .............. *H04R 1/028* (2013.01); *A45C 11/00* (2013.01); *A45C 11/002* (2025.01); *H04R 17/00* (2013.01);
(Continued)

(58) Field of Classification Search
CPC combination set(s) only.
See application file for complete search history.

(56) References Cited

U.S. PATENT DOCUMENTS 10,602,248 B2    3/2020   Chen
10,827,243 B1 *  11/2020  Peana et al. ........... H04R 1/025
(Continued)

FOREIGN PATENT DOCUMENTS

CN    202535410 U    11/2012
CN    103974174 A     8/2014
(Continued)

OTHER PUBLICATIONS

CN 1258427 A) >>> Speaker Apparatus And Internal Electronic Device Mounted With Speaker Unit (see title) (Year: 2000).*
(Continued)

*Primary Examiner* — Meless N Zewdu
(74) *Attorney, Agent, or Firm* — Slater Matsil, LLP

(57) ABSTRACT

A terminal protective case and an audio playback system, the case including a housing, a diaphragm, a piezoelectric sheet, and a drive circuit. The housing has a main body part and a fastening frame part, a side of the fastening frame part is fastened to a periphery of the main body part, the fastening frame part and the main body part jointly enclose an accommodating groove configured to accommodate a terminal. The diaphragm is within the main body part, the piezoelectric sheet is fastened to the diaphragm, a front cavity is on a side of the diaphragm, a sound outlet hole is disposed on the main body part, and the sound outlet hole
(Continued)

connects the front cavity to the outside of the main body part. The drive circuit is within the main body part and connected to the piezoelectric sheet, and is configured to drive the piezoelectric sheet.

18 Claims, 14 Drawing Sheets

(52) U.S. Cl.
  CPC .... *H04R 2201/028* (2013.01); *H04R 2499/11* (2013.01)

(56) References Cited

U.S. PATENT DOCUMENTS

| | | | |
|---|---|---|---|
| 2011/0287726 A1 | 11/2011 | Huang | |
| 2014/0106676 A1 | 4/2014 | Yarger et al. | |
| 2016/0234585 A1 | 8/2016 | Filson et al. | |
| 2016/0286014 A1 | 9/2016 | Balogh | |
| 2017/0133578 A1* | 5/2017 | Suenaga | H01L 41/0471 |
| 2017/0208911 A1 | 7/2017 | Goldfain et al. | |
| 2018/0014096 A1* | 1/2018 | Miyoshi | H04R 1/02 |

FOREIGN PATENT DOCUMENTS

| | | |
|---|---|---|
| CN | 203984656 U | 12/2014 |
| CN | 208908494 U | 5/2019 |
| CN | 110049415 A | 7/2019 |
| CN | 210093444 U | 2/2020 |

OTHER PUBLICATIONS

CN 101322065 A) >>> Liquid Crystal Module, Liquid Crystal Module With Sound Function, Mobile Communication Device, And Mobile Information Processing Device (see title) (Year: 2008).*
CN 100499873 C) >>> Portable Communication Terminal Device And Electric Acoustic Converter Used In The Same (see title) (Year: 2009).*
(TW 201030561 A) >>> Panel Member Having Vibrating Elements (title) (Year: 2010).*
(WO 2015145906 A1) >>> Acoustic Generator, Acoustic Generation Device Provided With Same, and Electronic Apparatus (see title) (Year: 2015).*
(KR 20170093857 A) >>> Sound Generating Device and Electronic Equipment (see at least, the title and the abstract) (Year: 2017).*
(CN 110602614 A) >>> A Sounding Device And Electronic Device (see title) (Year: 2019).*
(CN 104956691 B) >>> Portable Piezoelectric Loudspeaker (see title) (Year: 2018).*
(CN 203984656 U) >>> Intelligent Portable Equipment Protecting Sleeve With A Piezoelectric Speaker (see title) (Year: 2014).*
(WO 2013153827 A1) >>> This electronic device (1) is provided with a piezoelectric element (30) and a diaphragm (10) that is vibrated by said piezoelectric element (30) (see abstract) (Year: 2013).*

\* cited by examiner

TERMINAL PROTECTIVE CASE AND AUDIO PLAYBACK SYSTEM

CROSS REFERENCE TO RELATED APPLICATIONS

This application is a national stage of International Application No. PCT/CN2021/074057, filed on Jan. 28, 2021, which claims priority to Chinese Patent Application No. 202010130959.2, filed on Feb. 28, 2020. Both of the aforementioned applications are hereby incorporated by reference in their entireties.

TECHNICAL FIELD

This application relates to the field of audio technologies, and in particular, to a terminal protective case and an audio playback system.

BACKGROUND

As a user's requirement for volume of a loudspeaker sound of a terminal (such as a mobile phone or a tablet) increases, an amplitude of a speaker (which may also be referred to as a loudspeaker) of the terminal continuously increases. Currently, amplitudes of some speakers reach 0.4 millimeter to 0.5 millimeter or even greater, and an increase in the amplitude of the speaker causes a corresponding increase in a size of the speaker. However, because a current terminal pursues lightweight and thinness, a size of a speaker mounted in the terminal is strictly limited. In this case, it is difficult to greatly increase an amplitude of the speaker, so that volume of the speaker is limited. Consequently, it is relatively difficult to increase loudspeaker volume of the terminal.

SUMMARY

An objective of this application is to provide a terminal protective case and an audio playback system. The audio playback system includes a terminal protective case and a terminal mounted in the terminal protective case. The terminal protective case has a piezoelectric speaker, and the piezoelectric speaker can make a sound together with a speaker of the terminal, so that the audio playback system has high loudspeaker volume.

According to a first aspect, this application provides a terminal protective case, including a housing, a diaphragm, a piezoelectric sheet, and a drive circuit. The housing includes a main body part and a fastening frame part, where a side of the fastening frame part is fastened to a periphery of the main body part, the fastening frame part and the main body part jointly enclose an accommodating groove, and the accommodating groove is configured to accommodate a terminal. When the terminal is accommodated in the terminal protective case, the terminal and the protective case jointly form an audio playback system. The diaphragm is located within the main body part, the piezoelectric sheet is fastened to the diaphragm, a front cavity is formed on a side of the diaphragm, a sound outlet hole is disposed on the main body part, and the sound outlet hole connects the front cavity to the outside of the main body part. The drive circuit is located within the main body part and is electrically connected to the piezoelectric sheet, and the drive circuit is configured to drive, in response to a communication signal of the terminal, the piezoelectric sheet to drive the diaphragm to vibrate.

In this application, the terminal protective case forms a piezoelectric speaker including a diaphragm and a piezoelectric sheet. The drive circuit can form a corresponding drive signal based on the communication signal of the terminal. The drive signal drives the piezoelectric sheet to deform, to drive the diaphragm to vibrate. The diaphragm pushes air in the front cavity to vibrate, to make a sound. The sound is propagated to the outside of the main body part through the sound outlet hole, so that the terminal protective case may make a sound. The drive circuit can drive, in response to the communication signal of the terminal, the piezoelectric sheet to drive the diaphragm to vibrate, so that the piezoelectric speaker makes a sound. Therefore, the piezoelectric speaker of the terminal protective case may make a sound together with a speaker of the terminal, to greatly increase loudspeaker volume of the audio playback system. In other words, the audio playback system has higher loudspeaker volume, and still has a good loudspeaker effect in a noisy environment or an outdoor environment.

The terminal can control, by using the communication signal, the piezoelectric speaker of the terminal protective case to make a sound or not to make a sound, so that the audio playback system can implement a plurality of loudspeaker modes such as making a sound by the terminal protective case alone, making a sound by the terminal alone, and making a sound by the terminal protective case and the terminal together. When the piezoelectric speaker of the terminal protective case and the speaker of the terminal make a sound together, the piezoelectric speaker and the speaker of the terminal may cooperate to form a multi-channel loudspeaker system. This improves sound field rendering and a stereo effect. Because the piezoelectric speaker has better high-frequency performance, the piezoelectric speaker can supplement and enhance high-frequency performance of the speaker of the terminal, so that the audio playback system has better sound quality.

Because a piezoelectric speaker core has a small thickness, when the terminal protective case forms the piezoelectric speaker, a thickness of the main body part of the terminal protective case can be controlled within a small range. This improves a hand holding feeling and portability of the audio playback system.

In a possible implementation, there is one piezoelectric sheet, and the piezoelectric sheet is fastened to a side of the diaphragm. In another possible implementation, there are two piezoelectric sheets, and the two piezoelectric sheets are respectively fastened on two sides of the diaphragm.

In a possible implementation, the main body part includes a bottom plate portion, a top plate portion, and a connection portion. The bottom plate portion and the top plate portion are disposed opposite to each other. The connection portion is connected between a periphery of the bottom plate portion and a periphery of the top plate portion, and the fastening frame part is connected to the bottom plate portion and/or the connection portion. The sound outlet hole is disposed on the connection portion.

In this implementation, the terminal protective case makes a sound from a side surface. When the terminal protective case is held by a user or placed on an object, the sound outlet hole is not easily blocked, so that the terminal protective case can normally make a sound. This improves user experience.

In a possible implementation, there may be a plurality of sound outlet holes, and the plurality of sound outlet holes are disposed at intervals. Each sound outlet hole is roughly in a rectangular shape. In another possible implementation, there may also be one sound outlet hole. In another possible implementation, the sound outlet hole may be alternatively in another shape such as a circle or an ellipse.

In a possible implementation, the housing includes a main housing and a cover plate, and the cover plate is fixedly connected to the main housing. The fastening frame part, and the bottom plate portion and the connection portion of the main body part are formed on the main housing, and the top plate portion of the main body part is formed on the cover plate. In this case, because the main housing and the cover plate can be manufactured separately, and the main housing and the cover plate can meet different performance requirements, the top plate portion of the main body part, the fastening frame part, and the bottom plate portion and the connection portion of the main body part can meet different performance requirements. For example, a top plate of the main body part has better hardness to improve anti-wear and anti-scratch performance. The fastening frame part, and the bottom plate portion and the connection portion of the main body part have better toughness to improve anti-impact performance, so that overall performance of the housing is better, and more diversified function requirements can be met. In another possible implementation, the fastening frame part and the bottom plate portion of the main body part are formed on the main housing, and the connection portion and the top plate portion are formed on the cover plate.

In a possible implementation, the fastening frame part is connected to the bottom plate portion, and the fastening frame part and the bottom plate portion may form a large connection area, to increase connection firmness between the fastening frame part and the bottom plate portion, and improve reliability of the terminal protective case. In another possible implementation, the fastening frame part is connected to the connection portion. In still another possible implementation, the fastening frame part is connected to both the bottom plate portion and the connection portion, to increase a connection area with the main body part.

In a possible implementation, the bottom plate portion includes a bottom plate body and a first protrusion. The first protrusion is fastened to a side that is of the bottom plate body and that faces the top plate portion. The top plate portion includes a top plate body and a second protrusion. The second protrusion is fastened to a side that is of the top plate body and that faces the bottom plate portion. The second protrusion is disposed opposite to the first protrusion; and a periphery of the diaphragm is fastened between the first protrusion and the second protrusion.

In this implementation, the diaphragm is fastened to the first protrusion and the second protrusion, so that the diaphragm is directly fastened to the main body part of the housing. In this case, a front cavity and a rear cavity of the piezoelectric speaker are formed by using space in the main body part. This improves space utilization of the terminal protective case and facilitates thinness of the terminal protective case.

In a possible implementation, the main body part may be made of a hard material, for example, a polycarbonate plastic or a metal material, to reduce housing vibration generated due to vibration of the diaphragm.

In a possible implementation, the main body part further includes one or more holders. One end of each holder is fixedly connected to the bottom plate portion, and the other end is fixedly connected to the top plate portion.

In this implementation, the one or more holders help improve support strength and connection firmness between the top plate portion and the bottom plate portion, so that overall structural strength of the main body part is significantly improved, and structural reliability of the terminal protective case is higher. The structural strength of the main body part is improved, which is also conducive to normal sound-making of the piezoelectric speaker.

In a possible implementation, the front cavity is located between the diaphragm and the bottom plate body and is located in the first protrusion. The first protrusion is in a ring shape, the first protrusion is provided with a first notch, and the first notch connects the front cavity and the sound outlet hole. First space is formed between the diaphragm and the top plate body, and the first space is located in the second protrusion. Second space is formed between the bottom plate body and the top plate body, and the second space is located on the outside of the second protrusion. The second protrusion is in a ring shape, the second protrusion is provided with a second notch, and the second notch connects the second space and the first space to form a rear cavity. In this implementation, space of the rear cavity formed within the main body part is large, so that the piezoelectric speaker has a good low-frequency sound pressure level.

In a possible implementation, there may be a plurality of first notches, and the plurality of first notches are disposed at intervals. In this case, a portion that is of the first protrusion and that is located between the two adjacent first notches can still fasten the diaphragm, so that a connection area between the first protrusion and the diaphragm is increased, and connection reliability between the first protrusion and the diaphragm is higher. For example, when there are a plurality of sound outlet holes, the plurality of first notches are disposed in a one-to-one correspondence with the plurality of sound outlet holes; or when there is one sound outlet hole, the sound outlet hole is connected to the plurality of first notches. In another possible implementation, there may be alternatively one first notch, and one first notch is connected to all sound outlet holes.

In a possible implementation, the second protrusion is provided with a second notch, and the second notch connects the first space of the rear cavity and the second space of the rear cavity. There may be a plurality of second notches, and the plurality of second notches are disposed at intervals. In this case, a portion that is of the second protrusion and that is located between the two adjacent second notches can still fasten the diaphragm, so that a connection area between the second protrusion and the diaphragm is increased, and connection reliability between the second protrusion and the diaphragm is higher. In another possible implementation, there may be one second notch.

In a possible implementation, the bottom plate portion may further include a limiting rib, and the limiting rib is fastened to a side that is of the bottom plate body and that faces the top plate portion. The limiting rib is located on a side of the first protrusion, and the limiting rib is higher than the first protrusion. The limiting rib may be configured to limit or assist in limiting a position of the second protrusion, so that positioning and fastening between the top plate portion and the top plate portion are more reliable. A gap is formed between the limiting rib and the top plate body, where the limiting rib is away from all or a portion of the top surface of the bottom plate body.

In another possible implementation, the front cavity is located between the diaphragm and the top plate body and is located in the second protrusion. A portion of the rear cavity is located between the diaphragm and the bottom plate portion, and is located in the first protrusion, and another portion of the rear cavity is located between the top plate portion and the bottom plate portion, and is located on the outside of the first protrusion. The two portions of the rear cavity are connected to each other.

In a possible implementation, the terminal protective case further includes a first cover body and a second cover body that are located within the main body part. The first cover body and the second cover body are disposed opposite to each other, and a periphery of the diaphragm is fastened between the first cover body and the second cover body. The front cavity is formed between the diaphragm and the first cover body. A connection hole is disposed on the first cover body, and the connection hole connects the front cavity and the sound outlet hole. A rear cavity is formed between the diaphragm and the second cover body. A leakage hole is disposed on the second cover body, and the leakage hole connects the rear cavity to the outside of the second cover body.

In this implementation, the first cover body, the second cover body, the diaphragm, and the piezoelectric sheet jointly form the piezoelectric speaker. The piezoelectric speaker may be first formed in the terminal protective case, and then the piezoelectric speaker is mounted into the main body part, to reduce assembly difficulty of the terminal protective case. In this way, a product yield of the terminal protective case is high. In addition, when the piezoelectric speaker is independently assembled into a module, assembly precision of the piezoelectric speaker is also ensured, so that the piezoelectric speaker has a higher product yield.

In a possible implementation, the leakage hole is disposed near middle space of the main body part, so that the rear cavity is connected to space that is within the main body part, that is located between the top plate portion and the bottom plate portion, and that is located on the outside of the second cover body. In this way, the space is used to expand space of the rear cavity of the piezoelectric speaker and improve a low-frequency sound pressure level of the piezoelectric speaker. In this case, the rear cavity of the piezoelectric speaker is an open rear cavity. In another possible implementation, the leakage hole may be alternatively disposed close to an edge of the main body part, that is, a connection portion facing the main body part, so that the leakage hole is directly connected to the outside of the main body part through a breather hole of the connection portion. The leakage hole of the second cover body may be disposed opposite to the breather hole.

In a possible implementation, the diaphragm and the piezoelectric sheet fastened to the diaphragm jointly form a piezoelectric speaker core. The terminal protective case includes a plurality of piezoelectric speaker cores. In this implementation, the plurality of piezoelectric speaker cores are disposed in the terminal protective case, to form a plurality of piezoelectric speakers. Therefore, loudspeaker volume of the terminal protective case and the audio playback system is significantly increased. This helps improve user experience.

In a possible implementation, the front cavities of the plurality of piezoelectric speaker cores are respectively connected to a plurality of sound outlet holes on different positions. In this case, the plurality of piezoelectric speakers may cooperate with each other to implement stereo. For example, one of the two piezoelectric speakers is connected to a sound outlet hole at the top of the terminal protective case and is set as a left sound channel, and the other is connected to a sound outlet hole at the bottom of the terminal protective case and is set as a right sound channel. In another possible implementation, the front cavities of the plurality of piezoelectric speaker cores are connected to one or more same sound outlet holes. In this case, volume of sounds made by the plurality of piezoelectric speakers is superimposed.

In a possible implementation, the plurality of sound outlet holes includes a first sound outlet hole and a second sound outlet hole. The first sound outlet hole and the second sound outlet hole are connected to the front cavities of different piezoelectric speaker cores. The first sound outlet hole and the second sound outlet hole are respectively located at two ends of the connection portion. In this implementation, a distance between the first sound outlet hole and the second sound outlet hole is long. This helps improve a stereo playback sound effect of the terminal protective case. In both a landscape use scenario and a portrait use scenario, the terminal protective case can implement stereo playback.

In a possible implementation, the terminal protective case further includes an electrical connector. The electrical connector is configured to plug in a connector of the terminal. The drive circuit is electrically connected to the electrical connector, and the communication signal of the terminal is transmitted to the drive circuit through the connector of the terminal and the electrical connector.

In this implementation, the terminal protective case is directly connected to the connector of the terminal through the electrical connector, to obtain the communication signal of the terminal, so that quality of communication between the terminal protective case and the terminal is good. In addition, the terminal protective case can further obtain a power signal from the terminal through the electrical connector, so that no battery or a related charging circuit needs to be additionally disposed on the terminal protective case. This helps simplify a hardware structure and a circuit structure of the terminal protective case.

In a possible implementation, the electrical connector includes a male connector and a female socket, one end of the male connector is fixedly and electrically connected to the female socket, and the female socket projects from the terminal protective case because the male connector is plugged in the connector of the terminal. In this implementation, another device (for example, a charger or a headset) may be electrically connected to the connector of the terminal by plugging in the female socket, to implement a communication connection and/or a power connection to the terminal.

In a possible implementation, the terminal protective case further includes a wireless communication module and a battery that are located within the main body part. The wireless communication module is electrically connected to the drive circuit. The wireless communication module is configured to perform wireless communication with the terminal, to receive the communication signal of the terminal. For example, the wireless communication module is configured to communicate with the wireless communication module of the terminal by using a wireless communication technology. The wireless communication technology may include but is not limited to a Bluetooth technology, an ultra-wideband technology, a wireless local area network technology, and the like. The wireless communication module may include a radio frequency circuit and an antenna electrically connected to the radio frequency circuit. The antenna is configured to convert a received electromagnetic wave into a radio frequency signal, and the radio frequency circuit is configured to demodulate the radio frequency signal into a baseband signal.

The battery is electrically connected to the wireless communication module and the drive circuit. The battery is configured to supply power to the terminal protective case. A charging module is electrically connected to the battery, and an external charging device charges the battery through the charging module. For example, the charging module may include an electrical connector, for example, a universal serial bus connector. The main body part is provided with a charging socket, and the external charging device may be connected to the charging module through the charging socket.

In this implementation, because the terminal protective case communicates with the terminal through wireless communication, and the battery is disposed in the terminal protective case. Therefore, the terminal protective case can work normally in a scenario in which the terminal protective case is separated from the terminal. This improves user experience. For example, the terminal protective case may be charged or play music after being detached from the terminal.

In a possible implementation, the terminal protective case further includes a wireless communication module, a charging coil, and a wireless charging circuit that are located within the main body part. The wireless communication module is electrically connected to the drive circuit. The wireless communication module is configured to perform wireless communication with the terminal, to receive the communication signal of the terminal. An input terminal of the wireless charging circuit is connected to the charging coil, and an output terminal of the wireless charging circuit is connected to the drive circuit and the wireless communication module. The wireless charging circuit is configured to: control the charging coil to be coupled to a charging coil of the terminal, and supply power to the drive circuit and the wireless communication module.

In this implementation, no battery needs to be disposed in the terminal protective case, and a power supply is obtained by using a wireless charging technology. The charging coil and the wireless charging circuit are small in size and light in weight, thereby facilitating thinness and lightweight of the terminal protective case.

In a possible implementation, the drive circuit includes a positive power interface, a negative power interface, a first capacitor, a boost circuit, a second capacitor, a power amplifier, a signal interface, a demodulator, and filtering matched impedance. The positive power interface is connected to a first input terminal of the boost circuit, and the negative power interface is connected to a second input terminal of the boost circuit. One terminal of the first capacitor is connected between the positive power interface and the first input terminal of the boost circuit, and the other terminal of the first capacitor is connected between the negative power interface and the second input terminal of the boost circuit. A first output terminal of the boost circuit is connected to a positive input terminal of the power amplifier, and a second output terminal of the boost circuit is connected to a negative input terminal of the power amplifier. One terminal of the second capacitor is connected between the first output terminal of the boost circuit and the positive input terminal of the power amplifier, and the other terminal of the second capacitor is connected between the second output terminal of the boost circuit and the negative input terminal of the power amplifier. The demodulator is connected between the signal interface and a signal input terminal of the power amplifier. The demodulator is configured to demodulate a signal received by the signal interface into an audio signal, and the power amplifier is configured to amplify the audio signal and form a drive signal. The filtering matched impedance is connected between an output terminal of the power amplifier and the piezoelectric sheet, and the filtering matched impedance is configured to send the drive signal to the piezoelectric sheet after filtering and attenuating the drive signal.

In this implementation, the boost circuit is configured to boost an output voltage of the battery and then provide the boosted output voltage to the power amplifier. The first capacitor and the second capacitor can regulate an output voltage of the battery and an output voltage of the boost circuit, and are also configured to provide a large transient peak current, so as to meet a driving current requirement of the piezoelectric sheet of the piezoelectric speaker.

According to a second aspect, this application further provides an audio playback system, including a terminal and the terminal protective case according to any one of the foregoing. Because the piezoelectric speaker of the terminal protective case can make a sound together with a speaker of the terminal, the audio playback system has high loudspeaker volume, and still has a good loudspeaker effect in a noisy environment or an outdoor environment.

According to a third aspect, this application further provides an audio playback system, including a terminal and a terminal protective case. The terminal protective case includes a housing, a diaphragm, a piezoelectric sheet, and a first conductive contact. The housing includes a main body part and a fastening frame part. A side of the fastening frame part is fastened to a periphery of the main body part, and the fastening frame part and the main body part jointly enclose an accommodating groove. The diaphragm is located within the main body part, the piezoelectric sheet is fastened to the diaphragm, a front cavity is formed on a side of the diaphragm, a sound outlet hole is disposed on the main body part, and the sound outlet hole connects the front cavity to the outside of the main body part. The first conductive contact is fastened to the fastening frame part and/or the main body part and projects from the accommodating groove, and the first conductive contact is electrically connected to the piezoelectric sheet.

The terminal includes a drive circuit and a second conductive contact electrically connected to the drive circuit. The terminal is accommodated in the accommodating groove. The second conductive contact abuts against the first conductive contact. The drive circuit is configured to convert an audio signal into a drive signal. The drive signal is transmitted to the piezoelectric sheet through the second conductive contact and the first conductive contact, to drive the piezoelectric sheet to drive the diaphragm to vibrate.

In this application, the terminal may transmit the drive signal to the piezoelectric sheet of the terminal protective case, to drive the piezoelectric sheet to drive the diaphragm to vibrate. Therefore, the piezoelectric speaker of the terminal protective case may make a sound under the control of the terminal. The piezoelectric speaker of the terminal protective case may make a sound together with a speaker of the terminal to greatly increase loudspeaker volume of the audio playback system. In other words, the audio playback system has high loudspeaker volume, and the audio playback system still has a good loudspeaker effect in a noisy environment or an outdoor environment.

The terminal can control, by using the drive signal, the piezoelectric speaker of the terminal protective case to make a sound or not to make a sound, so that the audio playback system can implement a plurality of loudspeaker modes such as making a sound by the terminal protective case alone, making a sound by the terminal alone, and making a sound by the terminal protective case and the terminal together. In addition, when the piezoelectric speaker of the terminal protective case and the speaker of the terminal make a sound together, the piezoelectric speaker and the speaker of the terminal may cooperate to form a multi-channel loudspeaker system. This improves sound field rendering and a stereo effect.

Because the piezoelectric sheet of the piezoelectric speaker of the terminal protective case is directly driven by the drive signal sent by the terminal, a structure such as a battery, a charging circuit, or a piezoelectric sheet drive circuit does not need to be disposed on the terminal protective case. Therefore, the terminal protective case has a simple structure and low costs.

In some possible implementations, the first conductive contact may be of a protrusion structure, a dome structure, or a pad structure, and the first conductive contact may be made of a material such as metal. The second conductive contact may be of a protrusion structure, a dome structure, or a pad structure, and the first conductive contact may be made of a material such as metal.

In a possible implementation, the main body part includes a bottom plate portion, a top plate portion, and a connection portion. The bottom plate portion and the top plate portion are disposed opposite to each other. The connection portion is connected between a periphery of the bottom plate portion and a periphery of the top plate portion, and the fastening frame part is connected to the bottom plate portion and/or the connection portion. The sound outlet hole is disposed on the connection portion.

In this implementation, the terminal protective case makes a sound from a side surface. When the terminal protective case is held by a user or placed on an object, the sound outlet hole is not easily blocked, so that the terminal protective case can normally make a sound. This improves user experience.

In a possible implementation, there may be a plurality of sound outlet holes, and the plurality of sound outlet holes are disposed at intervals. Each sound outlet hole is roughly in a rectangular shape. In another possible implementation, there may also be one sound outlet hole. In another possible implementation, the sound outlet hole may be alternatively in another shape such as a circle or an ellipse.

In a possible implementation, the housing includes a main housing and a cover plate, and the cover plate is fixedly connected to the main housing. The fastening frame part, and the bottom plate portion and the connection portion of the main body part are formed on the main housing, and the top plate portion of the main body part is formed on the cover plate. In this case, because the main housing and the cover plate can be manufactured separately, and the main housing and the cover plate can meet different performance requirements, the top plate portion of the main body part, the fastening frame part, and the bottom plate portion and the connection portion of the main body part can meet different performance requirements. For example, a top plate of the main body part has better hardness to improve anti-wear and anti-scratch performance. The fastening frame part, and the bottom plate portion and the connection portion of the main body part have better toughness to improve anti-impact performance, so that overall performance of the housing is better, and more diversified function requirements can be met. In another possible implementation, the fastening frame part and the bottom plate portion of the main body part are formed on the main housing, and the connection portion and the top plate portion are formed on the cover plate.

In a possible implementation, the fastening frame part is connected to the bottom plate portion, and the fastening frame part and the bottom plate portion may form a large connection area, to increase connection firmness between the fastening frame part and the bottom plate portion, and improve reliability of the terminal protective case. In another possible implementation, the fastening frame part is connected to the connection portion. In still another possible implementation, the fastening frame part is connected to both the bottom plate portion and the connection portion, to increase a connection area with the main body part.

In a possible implementation, the bottom plate portion includes a bottom plate body and a first protrusion. The first protrusion is fastened to a side that is of the bottom plate body and that faces the top plate portion. The top plate portion includes a top plate body and a second protrusion. The second protrusion is fastened to a side that is of the top plate body and that faces the bottom plate portion. The second protrusion is disposed opposite to the first protrusion. A periphery of the diaphragm is fastened between the first protrusion and the second protrusion.

In this implementation, the diaphragm is fastened to the first protrusion and the second protrusion, so that the diaphragm is directly fastened to the main body part of the housing. In this case, a front cavity and a rear cavity of the piezoelectric speaker are formed by using space in the main body part. This improves space utilization of the terminal protective case and facilitates thinness of the terminal protective case.

In a possible implementation, the main body part may be made of a hard material, for example, a polycarbonate plastic or a metal material, to reduce housing vibration generated due to vibration of the diaphragm.

In a possible implementation, the main body part further includes one or more holders. One end of each holder is fixedly connected to the bottom plate portion, and the other end is fixedly connected to the top plate portion.

In this implementation, the one or more holders help improve support strength and connection firmness between the top plate portion and the bottom plate portion, so that overall structural strength of the main body part is significantly improved, and structural reliability of the terminal protective case is higher. The structural strength of the main body part is improved, which is also conducive to normal sound-making of the piezoelectric speaker.

In a possible implementation, the front cavity is located between the diaphragm and the bottom plate body and is located in the first protrusion. The first protrusion is in a ring shape, the first protrusion is provided with a first notch, and the first notch connects the front cavity and the sound outlet hole. First space is formed between the diaphragm and the top plate body, and the first space is located in the second protrusion. Second space is formed between the bottom plate body and the top plate body, and the second space is located on the outside of the second protrusion. The second protrusion is in a ring shape, the second protrusion is provided with a second notch, and the second notch connects the second space and the first space to form a rear cavity. In this implementation, space of the rear cavity formed within the main body part is large, so that the piezoelectric speaker has a good low-frequency sound pressure level.

In a possible implementation, there may be a plurality of first notches, and the plurality of first notches are disposed at intervals. In this case, a portion that is of the first protrusion and that is located between the two adjacent first notches can still fasten the diaphragm, so that a connection area between the first protrusion and the diaphragm is increased, and connection reliability between the first protrusion and the diaphragm is higher. For example, when there are a plurality of sound outlet holes, the plurality of first notches are disposed in a one-to-one correspondence with the plurality of sound outlet holes; or when there is one sound outlet hole, the sound outlet hole is connected to the plurality of first notches. In another possible implementation, there may be alternatively one first notch, and one first notch is connected to all sound outlet holes.

In a possible implementation, the second protrusion is provided with a second notch, and the second notch connects the first space of the rear cavity and the second space of the rear cavity. There may be a plurality of second notches, and the plurality of second notches are disposed at intervals. In this case, a portion that is of the second protrusion and that is located between the two adjacent second notches can still fasten the diaphragm, so that a connection area between the second protrusion and the diaphragm is increased, and connection reliability between the second protrusion and the diaphragm is higher. In another possible implementation, there may be one second notch.

In a possible implementation, the bottom plate portion may further include a limiting rib, and the limiting rib is fastened to a side that is of the bottom plate body and that faces the top plate portion. The limiting rib is located on a side of the first protrusion, and the limiting rib is higher than the first protrusion. The limiting rib may be configured to limit or assist in limiting a position of the second protrusion, so that positioning and fastening between the top plate portion and the top plate portion are more reliable. A gap is formed between the limiting rib and the top plate body, where the limiting rib is away from all or a portion of the top surface of the bottom plate body.

In another possible implementation, the front cavity is located between the diaphragm and the top plate body and is located in the second protrusion. A portion of the rear cavity is located between the diaphragm and the bottom plate portion, and is located in the first protrusion, and another portion of the rear cavity is located between the top plate portion and the bottom plate portion, and is located on the outside of the first protrusion. The two portions of the rear cavity are connected to each other.

In a possible implementation, the terminal protective case further includes a first cover body and a second cover body that are located within the main body part. The first cover body and the second cover body are disposed opposite to each other, and a periphery of the diaphragm is fastened between the first cover body and the second cover body. The front cavity is formed between the diaphragm and the first cover body. A connection hole is disposed on the first cover body, and the connection hole connects the front cavity and the sound outlet hole. A rear cavity is formed between the diaphragm and the second cover body. A leakage hole is disposed on the second cover body, and the leakage hole connects the rear cavity to the outside of the second cover body.

In this implementation, the first cover body, the second cover body, the diaphragm, and the piezoelectric sheet jointly form the piezoelectric speaker. The piezoelectric speaker may be first formed in the terminal protective case, and then the piezoelectric speaker is mounted into the main body part, to reduce assembly difficulty of the terminal protective case. In this way, a product yield of the terminal protective case is high. In addition, when the piezoelectric speaker is independently assembled into a module, assembly precision of the piezoelectric speaker is also ensured, so that the piezoelectric speaker has a higher product yield.

In a possible implementation, the leakage hole is disposed near middle space of the main body part, so that the rear cavity is connected to space that is within the main body part, that is located between the top plate portion and the bottom plate portion, and that is located on the outside of the second cover body. In this way, the space is used to expand space of the rear cavity of the piezoelectric speaker and improve a low-frequency sound pressure level of the piezoelectric speaker. In this case, the rear cavity of the piezoelectric speaker is an open rear cavity. In another possible implementation, the leakage hole may be alternatively disposed close to an edge of the main body part, that is, a connection portion facing the main body part, so that the leakage hole is directly connected to the outside of the main body part through a breather hole of the connection portion. The leakage hole of the second cover body may be disposed opposite to the breather hole.

In a possible implementation, the diaphragm and the piezoelectric sheet fastened to the diaphragm jointly form a piezoelectric speaker core. The terminal protective case includes a plurality of piezoelectric speaker cores. In this implementation, the plurality of piezoelectric speaker cores are disposed in the terminal protective case, to form a plurality of piezoelectric speakers. Therefore, loudspeaker volume of the terminal protective case and the audio playback system is significantly increased. This helps improve user experience.

In a possible implementation, the front cavities of the plurality of piezoelectric speaker cores are respectively connected to a plurality of sound outlet holes on different positions. In this case, the plurality of piezoelectric speakers may cooperate with each other to implement stereo. For example, one of the two piezoelectric speakers is connected to a sound outlet hole at the top of the terminal protective case and is set as a left sound channel, and the other is connected to a sound outlet hole at the bottom of the terminal protective case and is set as a right sound channel. In another possible implementation, the front cavities of the plurality of piezoelectric speaker cores are connected to one or more same sound outlet holes. In this case, volume of sounds made by the plurality of piezoelectric speakers is superimposed.

In a possible implementation, the plurality of sound outlet holes includes a first sound outlet hole and a second sound outlet hole. The first sound outlet hole and the second sound outlet hole are connected to the front cavities of different piezoelectric speaker cores. The first sound outlet hole and the second sound outlet hole are respectively located at two ends of the connection portion. In this implementation, a distance between the first sound outlet hole and the second sound outlet hole is long. This helps improve a stereo playback sound effect of the terminal protective case. In both a landscape use scenario and a portrait use scenario, the terminal protective case can implement stereo playback.

DETAILED DESCRIPTION OF ILLUSTRATIVE EMBODIMENTS

The following describes embodiments of this application with reference to the accompanying drawings in embodiments of this application.

Embodiments of this application provide a terminal protective case and an audio playback system to which the terminal protective case is applied. The audio playback system further includes a terminal, and a terminal protective case that detachably sleeves over the outside of the terminal. The terminal protective case has a piezoelectric speaker, and the piezoelectric speaker may make a sound together with a speaker of the terminal, thereby greatly increasing loudspeaker volume of an audio playback system. The terminal may be an electronic product having a sound playback function, such as a mobile phone or a tablet computer.

Figure 1:
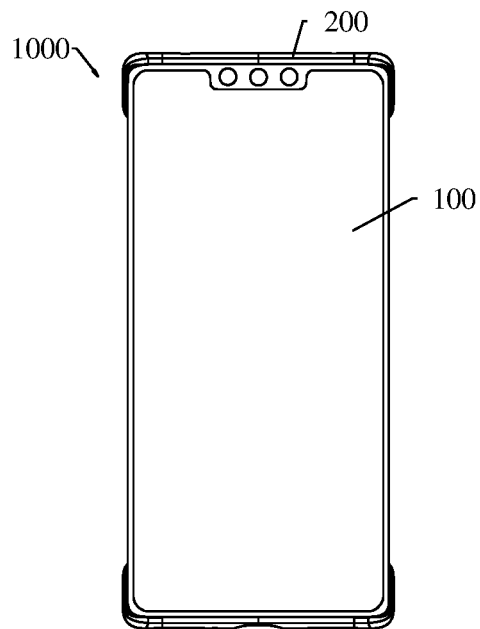
FIG. 1 is a schematic diagram of a structure of an audio playback system according to an embodiment of this application.

FIG. 1 is a schematic diagram of a structure of an audio playback system 1000 according to an embodiment of this application.

The audio playback system 1000 has a sound playback function. The audio playback system 1000 includes a terminal 100 and a terminal protective case 200. The terminal protective case 200 detachably sleeves on the outside of the terminal 100. In other words, the terminal protective case 200 may sleeve on the outside of the terminal 100, to protect the terminal 100. The terminal protective case 200 may be alternatively detached from the terminal 100, to be separated from the terminal 100. In this embodiment, an example in which the terminal 100 is a mobile phone is used for description.

Figure 2:
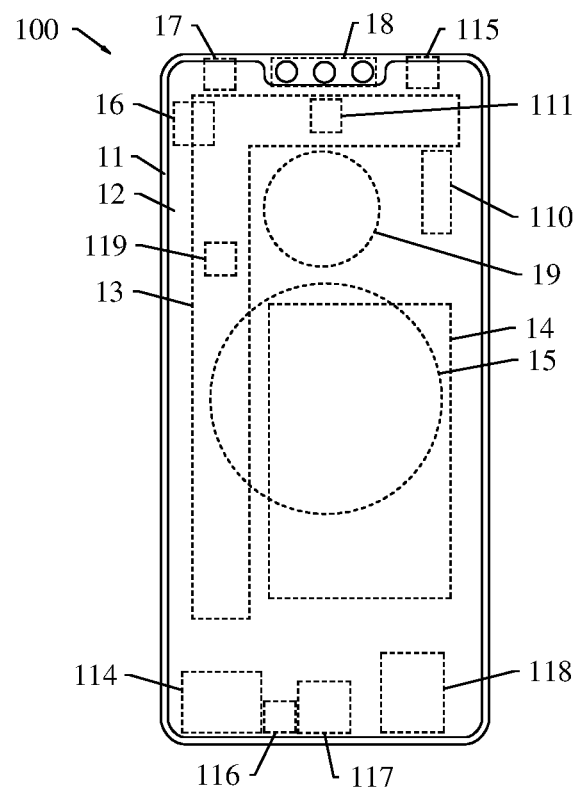
FIG. 2 is a schematic diagram of a structure of a terminal of the audio playback system shown in FIG. 1 in some embodiments.

FIG. 2 is a schematic diagram of a structure of a terminal 100 of the audio playback system 1000 shown in FIG. 1 in some embodiments.

The terminal 100 may include a housing 11, and function modules such as a display 12, a circuit board 13, a battery 14, a wireless charging coil 15, a wireless communication module 16, an infrared sensing module 17, a front-facing camera module 18, a rear-facing camera module 19, a flash module no, a screen sound-making module 111, a speaker 114, a first microphone (which may also be referred to as a microphone) 115, a second microphone 116, a connector 117, and a card holder 118 that are mounted on the housing 11.

The display 12 is configured to display an image, and the display 12 may further integrate a touch function. The display 12 is fastened to a side of the housing 11, and the display 12 and the housing 11 jointly enclose an internal cavity of the entire terminal 100. Other function modules of the terminal 100 may be accommodated in the internal cavity of the entire system, and the housing 11 can fasten and protect these function modules. For example, the housing 11 may include a middle frame and a rear cover, and the rear cover and the display 12 are respectively fastened on two opposite sides of the middle frame. The middle frame may include a frame and a middle plate fastened within the frame, and the frame is connected between a periphery of the rear cover and a periphery of the display 12. The frame and the middle plate may be integrally formed, or may be assembled to form an integrated structure. The frame and the rear cover may be integrally formed, or may be assembled to form an integrated structure.

There may be one or more circuit boards 13. In embodiments of this application, "a plurality of" means at least two. A plurality of components may be fastened on the circuit board 13. The plurality of components include but are not limited to a processor 119, a memory, and the like. The memory is coupled to the processor 119. The memory is configured to store computer program code. The computer program code includes computer instructions. The processor 119 is configured to invoke the computer instructions to enable the terminal 100 to perform corresponding operations. The processor 119 is coupled to another function module of the terminal 100, and is configured to control work of the another function module.

The battery 14 is electrically connected to the another function module of the terminal 100, and is configured to supply power to the terminal 100. The wireless charging coil 15 is electrically connected to the battery 14, and an external power supply may charge the battery 14 through the wireless charging coil 15. In some embodiments, the battery 14 may alternatively charge another device through the wireless charging coil 15.

The wireless communication module 16 is configured to communicate with a network or another device by using a wireless communication technology. The wireless communication technology includes a global system for mobile communication (global system for mobile communication, GSM), a general packet radio service (general packet radio service, GPRS), a code division multiple access (code division multiple access, CDMA), a wideband code division multiple access (wideband code division multiple access, WCDMA), a time-division code division multiple access (time-division code division multiple access, TD-SCDMA), long term evolution (long term evolution, LTE), Bluetooth (Bluetooth, BT), a global navigation satellite system (global navigation satellite system, GNSS), wireless local area networks (wireless local area networks, WLAN) (such as a wireless fidelity (wireless fidelity, Wi-Fi) network), ultra wide band (ultra wide band, UWB), near field communication (near field communication, NFC), and/or frequency modulation (frequency modulation, FM), and the like. In embodiments of this application, "A and/or B" includes three cases: "A", "B", and "A and B". For example, the wireless communication module 16 may include a plurality of antennas configured to transmit and receive an electromagnetic wave signal, and each antenna may be configured to cover one or more communication frequency bands. Different antennas may be reused to improve utilization of the antennas.

The infrared sensing module 17 is configured to transmit an infrared (infrared, IR) signal, to communicate with another device by using an infrared technology.

The front-facing camera module 18 is configured to collect light in front of the terminal 100 to perform image shooting. The front of the terminal 100 is space on a side facing the display 12. The rear-facing camera module 19 is configured to collect light at the rear of the terminal 100 for image shooting. The rear of the terminal 100 is space on a side opposite to the front of the terminal 100. The flash module no is configured to supplement light.

The screen sound-making module 111 is configured to drive the display 12 to vibrate to make a sound. The speaker 114 is configured to convert an electrical signal into a sound signal. In some embodiments, the speaker 114 of the terminal 100 is configured to make a loudspeaker sound, and the screen sound-making module 111 is configured to drive the display 12 to vibrate to make a non-loudspeaker sound. For example, the loudspeaker sound may be a hands-free call sound, loudspeaker voice information, loudspeaker music, navigation voice, broadcast, or the like. The non-loudspeaker sound may be a non-hands-free call sound, non-loudspeaker voice information, or the like.

The first microphone 115 and the second microphone 116 may be located at the top and the bottom of the terminal 100 respectively, and the first microphone 115 and the second microphone 116 may work cooperatively or work independently of each other. It may be understood that, in this embodiment of this application, orientation words such as "top" and "bottom" in related descriptions of the terminal 100 are described based on a perspective of the terminal 100 shown in FIG. 1 and FIG. 2, and do not limit a factor such as a placement location of the terminal 100 in an actual use scenario.

The connector 117 is configured to connect to an electrical connector of another device, to electrically connect to the another device. This implements power transmission and/or signal transmission. The connector 117 may be a universal serial bus (universal serial bus, USB) connector.

The card holder 118 is configured to mount a subscriber identity module (subscriber identification module, SIM) card, and the terminal 100 identifies a subscriber of a global system for mobile communication through the subscriber identity module card.

It may be understood that, in some other embodiments, the terminal 100 may include all or some of the foregoing function modules, or the terminal 100 may also include another function module such as a button, a sensor module, or a motor. The button is configured to receive a user operation, so that the terminal 100 can respond to the user operation. The sensor module may include one or more of a pressure sensor, a gyro sensor, a barometric pressure sensor, a magnetic sensor, an acceleration sensor, a distance sensor, an optical proximity sensor, a fingerprint sensor, a temperature sensor, a touch sensor or an ambient light sensor. The motor may generate a vibration prompt. The motor may be used for an incoming call vibration prompt, or may be used for a touch vibration feedback. A quantity, a type, a location, and the like of a specific function module of the terminal 100 are not strictly limited in this embodiment of this application.

Figure 3:
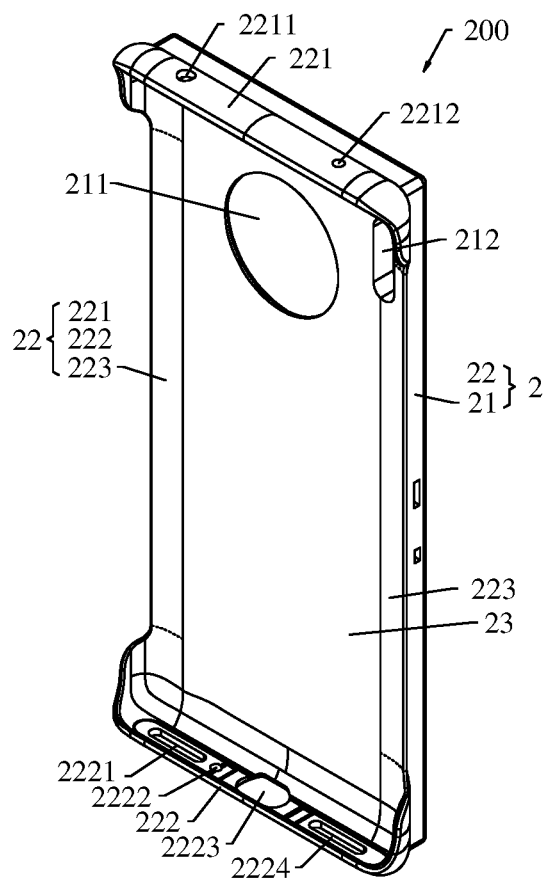
FIG. 3 is a schematic diagram of a structure of a terminal protective case of the audio playback system shown in FIG. 1 in some embodiments.

FIG. 3 is a schematic diagram of a structure of a terminal protective case 200 of the audio playback system 1000 shown in FIG. 1 in some embodiments.

The terminal protective case 200 includes a housing 2. The housing 2 is configured to protect a part (described below) that is of the terminal protective case 200 and that is mounted within the housing 2. The housing 2 includes a main body part 21 and a fastening frame part 22. A side of the fastening frame part 22 is fastened to a periphery of the main body part 21. The fastening frame part 22 and the main body part 21 jointly enclose an accommodating groove 23, and the accommodating groove 23 is configured to accommodate the terminal 100.

In some embodiments, as shown in FIG. 3, the fastening frame part 22 includes a top frame part 221 and a bottom frame part 222, and the top frame part 221 and the bottom frame part 222 are disposed at intervals. The main body part 21 is roughly rectangular. The top frame part 221 is connected to a top short side of the main body part 21, and two ends of the top frame part 221 are respectively connected to top ends of two long sides of the main body part 21. In other words, the top frame part 221 is connected to two top corners of the main body part 21, so that the top frame part 221 forms two wrapping top corners. The bottom frame part 222 is connected to a bottom short side of the main body part 21, and two ends of the bottom frame part 222 are respectively connected to bottom ends of two long sides of the main body part 21. In other words, the bottom frame part 222 is connected to two bottom corners of the main body part 21, so that the bottom frame part 222 forms two wrapping bottom corners. The two wrapping bottom corners and the two wrapping top corners can jointly wrap four corners of the terminal 100, to better protect the terminal 100. This reduces a damage risk and a damage degree of the terminal 100 in scenarios such as falling and collision. It may be understood that, in this embodiment of this application, orientation words such as "top" and "bottom" in related descriptions of the terminal protective case 200 are described based on a perspective of the terminal protective case 200 shown in FIG. 1 and FIG. 3, and do not limit a factor such as a placement location of the terminal protective case 200 in an actual use scenario.

In some embodiments, as shown in FIG. 3, the fastening frame part 22 further includes two connection frame parts 223. The two connection frame parts 223 are disposed opposite to each other and are respectively connected between two ends of the top frame part 221 and two ends of the bottom frame part 222. The connection frame part 223 is lower than the top frame part 221 and the bottom frame part 222, that is, the connection frame part 223 is recessed relative to the top frame part 221 and the bottom frame part 222 to form an exposed region. When the terminal 100 is mounted in the accommodating groove 23 of the terminal protective case 200, a button on a side surface of the terminal 100 may be exposed through the exposed region of the terminal protective case 200. The two connection frame parts 223 may fasten and protect the side of the terminal 100 to some extent, so that the terminal protective case 200 protects the terminal 100 more comprehensively.

In some embodiments, as shown in FIG. 3, the main body part 21 is provided with a camera hole 211 and a flash hole 212 that are spaced apart from each other. The top frame part 221 of the fastening frame part 22 is provided with an infrared hole 2211 and a first microphone hole 2212 that are spaced apart from each other. The bottom frame part 222 of the fastening frame part 22 is provided with a speaker hole 2221, a second microphone hole 2222, a connector hole 2223, and a card holder hole 2224 that are spaced apart from each other. With reference to FIG. 2 and FIG. 3, when the terminal 100 is accommodated in the accommodating groove 23 of the terminal protective case 200, the rear-facing camera module 19 corresponds to the camera hole 211, so as to perform image shooting through the camera hole 211. The flash module no corresponds to the flash hole 212, so as to emit light through the flash hole 212. The infrared sensing module 17 corresponds to the infrared hole 2211, so as to transmit an infrared signal through the infrared hole 2211. The first microphone 115 corresponds to the first microphone hole 2212, so as to collect a sound signal through the first microphone hole 2212. The speaker 114 corresponds to the speaker hole 2221, so as to make a loudspeaker sound signal through the speaker hole 2221. The second microphone 116 corresponds to the second microphone hole 2222, so as to collect a sound signal through the second microphone hole 2222. The connector 117 corresponds to the connector hole 2223, so that an external electrical connector can be plugged in the connector 117 through the connector hole 2223. The card holder 118 corresponds to the card holder hole 2224, so that the subscriber identity card can be mounted in the terminal 100 through the card holder hole 2224. In some other embodiments, the two connection frame parts 223 of the fastening frame part 22 may also be as high as the top frame pall 221 and the bottom frame pall 222, and a button hole is disposed at a position that is on the connection frame part 223 and that corresponds to a button of the terminal 100. A specific structure of the fastening frame pall 22 is not strictly limited in this application.

A shape of the main body part 21 of the terminal protective case 200 adapts to a shape of the terminal 100, and a shape of the fastening frame part 22 also adapts to a shape of the terminal 100. For example, when the terminal 100 is in a circular shape, the main body part 21 is also in a circular shape, the fastening frame part 22 is in a shape of a circular ring (which may be a continuous circular ring, or may be formed by a plurality of concentric arc-shaped segments), and the main body part 21 and the fastening frame pall 22 roughly enclose the circular accommodating groove 23 to accommodate the terminal 100. Positions, a quantity, and shapes of holes on the main body pall 21 and the fastening frame part 22 are set according to a requirement of the terminal 100.

Figure 4:
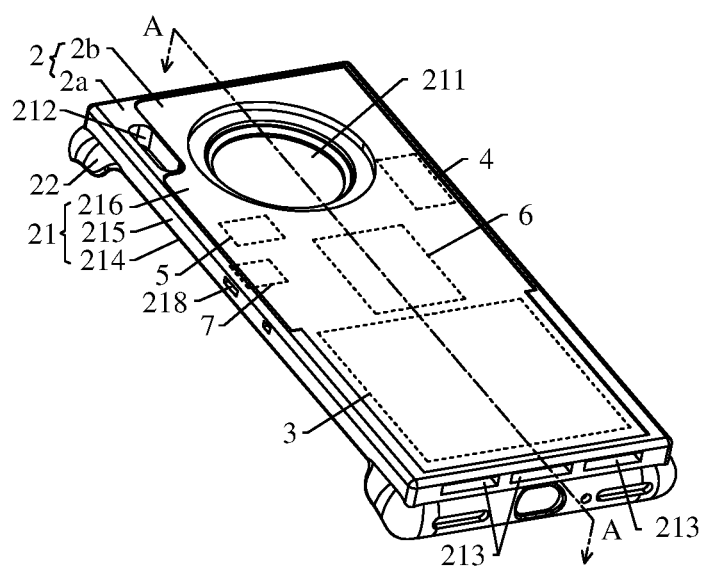
FIG. 4 is a schematic diagram of a structure of the terminal protective case shown in FIG. 3 from another angle.
Figure 5:
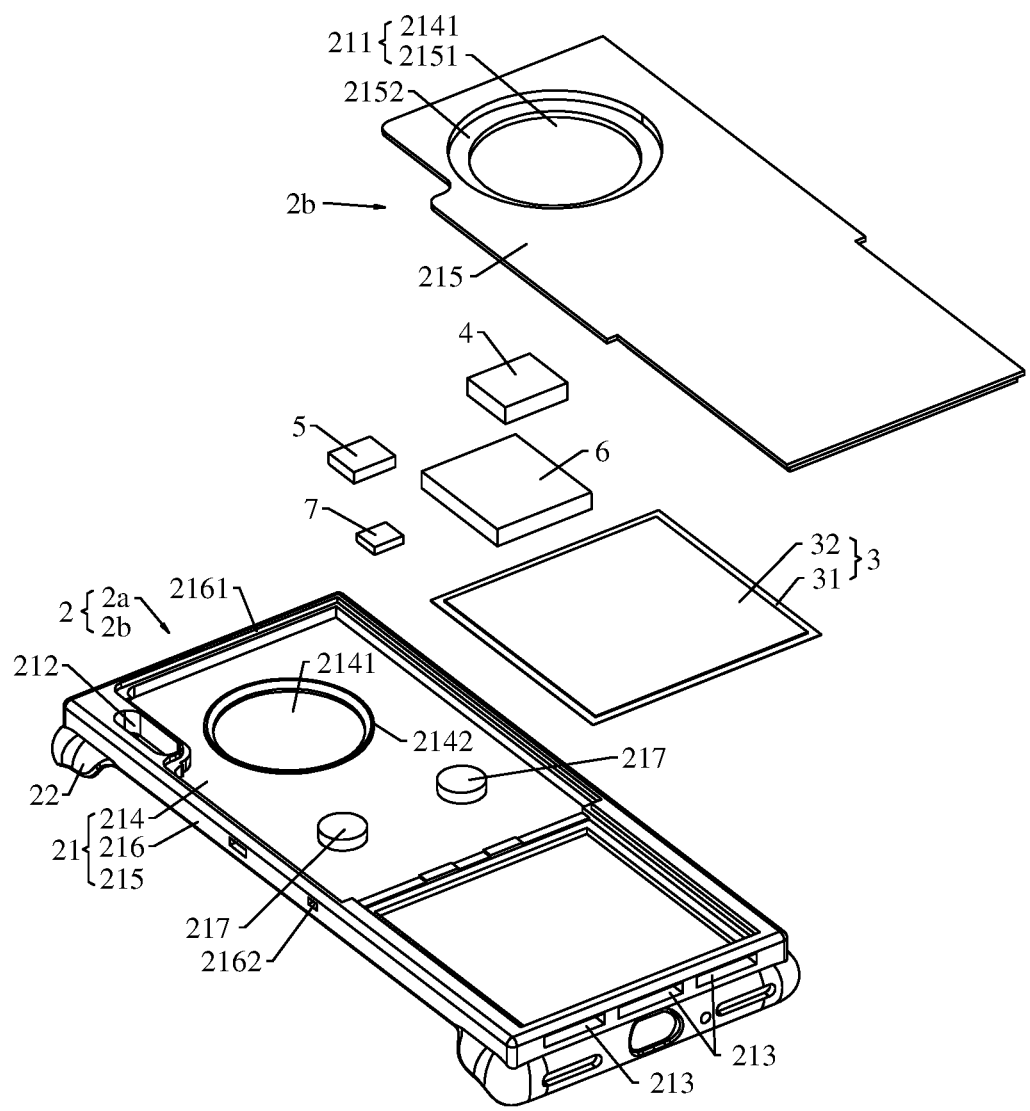
FIG. 5 is a schematic diagram of an exploded structure of the terminal protective case shown in FIG. 4.

Refer to FIG. 4 and FIG. 5 together. FIG. 4 is a schematic diagram of a structure of the terminal protective case 200 shown in FIG. 3 from another angle, and FIG. 5 is a schematic diagram of an exploded structure of the terminal protective case 200 shown in FIG. 4.

In some embodiments, the terminal protective case 200 includes a main housing 2a and a cover plate 2b. The cover plate 2b is fixedly connected to the main housing 2a, and the cover plate 2b and the main housing 2a jointly form the housing 2 of the terminal protective case 200. For example, the fastening frame part 22 of the housing 2 is formed on the main housing 2a, a portion of the main body part 21 of the housing 2 is formed on the main housing 2a, and another portion of the main body part 21 is formed on the cover plate 2b. When the cover plate 2b is fastened to the main housing 2a, the two portions of the main body part 21 are fastened to each other, and accommodation space is formed within the main body part 21. The accommodation space is used to accommodate another component of the terminal protective case 200. The main housing 2a and the cover plate 2b each include a plurality of structures (refer to the following description). The plurality of structures may be an integrated structure, or may be an integrated structure formed by assembly and fastening.

In some embodiments, the terminal protective case 200 may further include a piezoelectric speaker core 3, a drive circuit 4, a wireless communication module 5, a battery 6, and a charging module 7 that are located within the main body part 21.

In some embodiments, as shown in FIG. 5, the piezoelectric speaker core 3 includes a diaphragm 31 and a piezoelectric sheet 32, and the piezoelectric sheet 32 is fastened to the diaphragm 31. The piezoelectric speaker core 3 may include a piezoelectric sheet 32, where the piezoelectric sheet 32 is fastened to a side of the diaphragm 31. Alternatively, the piezoelectric speaker core 3 may include two piezoelectric sheets 32, where the two piezoelectric sheets 32 are respectively fastened to two sides of the diaphragm 31. The piezoelectric sheet 32 may be a complete integrated piezoelectric sheet, or may be formed by splicing several small piezoelectric sheet units.

For example, the diaphragm 31 is fastened between the main housing 2a and the cover plate 2b, so that both the diaphragm 31 and the piezoelectric sheet 32 are located within the main body part 21. In this embodiment, the main body part 21 may be used as a housing to form a piezoelectric speaker together with the piezoelectric speaker core 3. The diaphragm 31 divides space within the main body part 21 into two independent spaces. One side of the diaphragm 31 forms a front cavity of the piezoelectric speaker, and the other side of the diaphragm 31 forms a rear cavity of the piezoelectric speaker. When the piezoelectric speaker works, the piezoelectric sheet 32 deforms according to a drive signal, to drive the diaphragm 31 to vibrate, and the diaphragm 31 pushes air in the front cavity to vibrate, so as to make a sound.

A sound outlet hole 213 is disposed on the main body part 21, and the sound outlet hole 213 connects space within the main body part 21 and space on the outside of the main body part 21. For example, the sound outlet hole 213 connects the front cavity to the outside of the main body part 21. In this case, a sound made by the piezoelectric speaker can be propagated to the outside of the main body part 21 through the sound outlet hole 213, so that the terminal protective case 200 makes a sound.

In this embodiment, the terminal protective case 200 uses the piezoelectric speaker as a sound-making component.

Because a thickness of the piezoelectric speaker core 3 is very small, when the terminal protective case 200 forms the piezoelectric speaker, the thickness of the main body part 21 of the terminal protective case 200 may be controlled within a small range. This improves a hand holding feeding and portability of the audio playback system 1000.

For example, the main body part 21 may be made of a hard material, for example, a polycarbonate (polycarbonate, PC) plastic or a metal material, to reduce housing vibration generated due to vibration of the diaphragm 31.

In some embodiments, the drive circuit 4 is electrically connected to the piezoelectric sheet 32. The drive circuit 4 is configured to respond to a communication signal of the terminal 100, and drive the piezoelectric sheet 32 to drive the diaphragm 31 to vibrate. The drive circuit 4 can form a corresponding drive signal based on the communication signal. The drive signal drives the piezoelectric sheet 32 to deform, and drives the diaphragm 31 to vibrate, so that the piezoelectric speaker core 3 makes a sound.

In this embodiment, the drive circuit 4 can drive, in response to the communication signal of the terminal 100, the piezoelectric sheet 32 to drive the diaphragm 31 to vibrate, so that the piezoelectric speaker makes a sound. The piezoelectric speaker of the terminal protective case 200 may make a sound together with the speaker 114 of the terminal 100, to greatly increase loudspeaker volume of the audio playback system 1000. In other words, the audio playback system 1000 has high loudspeaker volume, and still has a good loudspeaker effect in a noisy environment or an outdoor environment. In addition, the terminal 100 can control, by u sing the communication signal, the piezoelectric speaker of the terminal protective case 200 to make a sound or not to make a sound, so that the audio playback system 1000 can implement a plurality of loudspeaker modes, such as making a sound by the terminal protective case 200 alone, making a sound by the terminal 100 alone, and making a sound by the terminal protective case 200 and the terminal 100 together. When the piezoelectric speaker of the terminal protective case 200 and the speaker 114 of the terminal 100 make a sound together, the piezoelectric speaker and the speaker of the terminal may cooperate to form a multi-channel loudspeaker system. This improves sound field rendering and a stereo effect.

In addition, because the piezoelectric speaker has better high-frequency performance, the piezoelectric speaker can supplement and enhance high-frequency performance of the speaker 114 of the terminal 100, so that the audio playback system 1000 has better sound quality.

Figure 6:
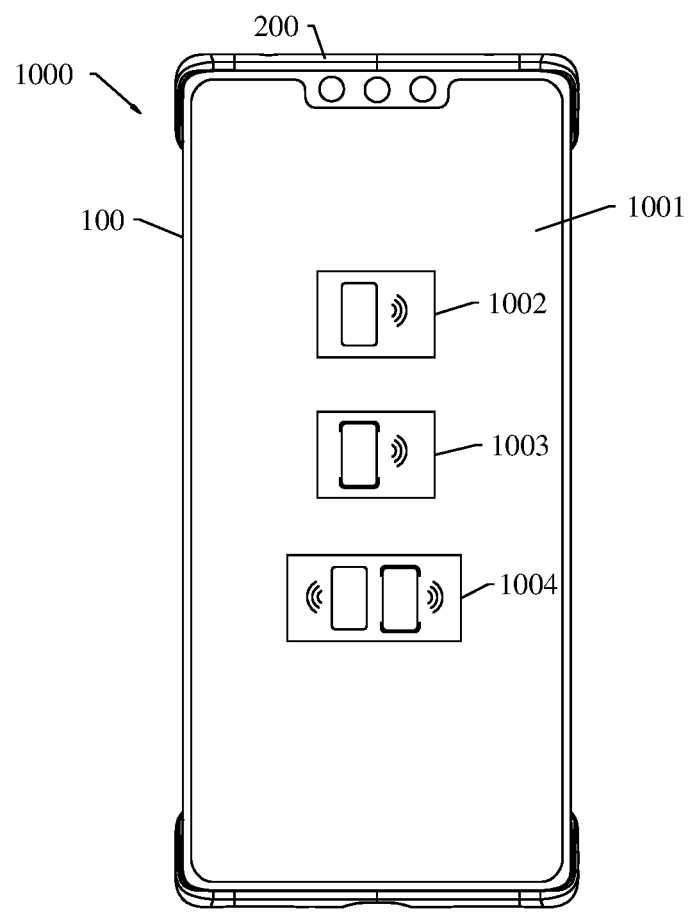
FIG. 6 is a schematic diagram of a state of the audio playback system shown in FIG. 1 in some use scenarios.

FIG. 6 is a schematic diagram of a state of the audio playback system 1000 shown in FIG. 1 in some use scenarios.

In some embodiments, when the terminal 100 needs to play a loudspeaker sound (for example, playing music or making a hands-free call), the terminal 100 displays a loudspeaker mode selection interface 1001. The interface includes an icon 1002 for separately playing a loudspeaker sound through the terminal, an icon 1003 for separately playing a loudspeaker sound through the terminal protective case, and an icon 1004 for playing a loudspeaker sound through both the terminal and the terminal protective case. A user may trigger a corresponding icon based on a requirement, and the terminal 100 controls, in response to a user operation, the terminal 100 and/or the terminal protective case 200 to play a loudspeaker sound, to meet a use requirement and improve loudspeaker experience.

In some other embodiments, the terminal 100 may alternatively select a loudspeaker mode in another manner, for example, by using a button or a sound. In some other embodiments, the user may select the loudspeaker mode, or may set a default loudspeaker mode. A selection manner and a setting manner of the loudspeaker mode are not strictly limited in this embodiment of this application.

Figure 7:
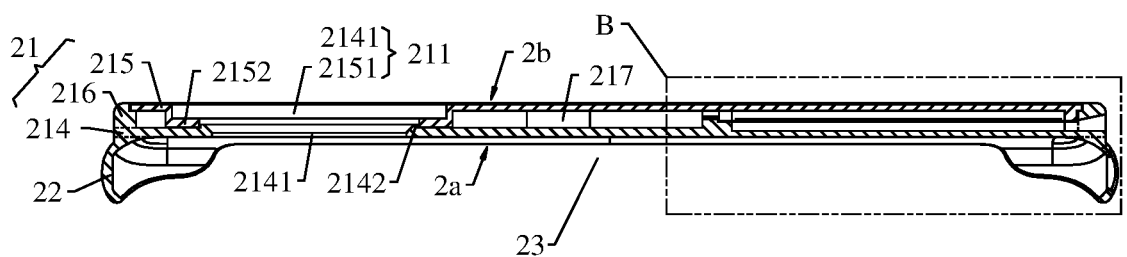
FIG. 7 is a schematic diagram of a structure of a portion of a terminal protective case that is shown in FIG. 4 and that is cut along A-A.

Refer to FIG. 4, FIG. 5, and FIG. 7 together, FIG. 7 is a schematic diagram of a structure of a portion of a terminal protective case 200 that is shown in FIG. 4 and that is cut along A-A.

In some embodiments, the main body part 21 includes a bottom plate portion 214, a top plate portion 215, and a connection portion 216. The bottom plate portion 214 and the top plate portion 215 are disposed opposite to each other, and the connection portion 216 is connected between a periphery of the bottom plate portion 214 and a periphery of the top plate portion 215. The connection portion 216 is roughly in a shape of a frame, and a specific shape of the connection portion 216 varies with shapes of the top plate portion 215 and the bottom plate portion 214. This is not strictly limited in this embodiment of this application. The bottom plate portion 214, the connection portion 216, and the top plate portion 215 jointly enclose space within the main body part 21. The fastening frame part 22 is connected to the bottom plate portion 214. When the terminal 100 is mounted in the accommodating groove 23 of the terminal protective case 200, the bottom plate portion 214 faces the terminal 100 and may be in contact with the terminal 100, the top plate portion 215 faces the terminal 100 in a backward manner, and the top plate portion 215 forms an appearance structure of the audio playback system 1000.

In this embodiment, the fastening frame part 22, and the bottom plate portion 214 and the connection portion 216 of the main body part 21 are formed on the main housing 2a, and the top plate portion 215 of the main body part 21 is formed on the cover plate 2b. In this case, because the main housing 2a and the cover plate 2b can be manufactured separately, and the main housing 2a and the cover plate 2b can meet different performance requirements, the top plate portion 215 of the main body part 21 can meet different performance requirements with the fastening frame part 22, and the bottom plate portion 214 and the connection portion 216 of the main body part 21. For example, the top plate of the main body part 21 has better hardness, so as to improve anti-wear and anti-scratch performance. The fastening frame part 22, and the bottom plate portion 214 and the connection portion 216 of the main body part 21 have better toughness, so as to improve impact resistance performance. In this way, overall performance of the case 2 is better, and more diversified function requirements may be met.

In addition, the fastening frame part 22 is connected to the bottom plate portion 214, and the fastening frame part 22 and the bottom plate portion 214 may form a large connection area, to increase connection firmness between the fastening frame part 22 and the bottom plate portion 214, and improve reliability of the terminal protective case 200. In some other embodiments, the fastening frame part 22 may be alternatively connected to the connection portion 216; or the fastening frame part 22 may be alternatively connected to both the bottom plate portion 214 and the connection portion 216, to increase a connection area to the main body part 21. This is not strictly limited in this embodiment of this application.

In some other embodiments, the fastening frame part 22 and the bottom plate portion 214 of the main body part 21 may be formed on the main housing 2a, and the connection portion 216 and the top plate portion 215 may be formed on the cover plate 2b. It may be understood that each portion of the housing 2 may be formed in a plurality of manners. A specific forming manner of the housing 2 is not strictly limited in this application.

In some embodiments, as shown in FIG. 4 and FIG. 5, a mounting groove 2161 may be disposed at an end that is of the connection portion 216 and that is away from the bottom plate portion 214. The mounting groove 2161 is disposed close to the inside of the connection portion 216, and continuously surrounds inside space of the connection portion 216. The top plate portion 215 is mounted on the mounting groove 2161, so as to better position and fasten the top plate portion 215 with the connection portion 216. In addition, the connection frame part 223 may also protect the top plate portion 215. In some other embodiments, alternatively, no mounting groove 2161 may be disposed on the connection portion 216, and the top plate portion 215 is directly fastened to a top side surface or an inner side surface of the connection portion 216.

In some embodiments, as shown in FIG. 4 and FIG. 5, the flash hole 212 is disposed on the main body part 21, and the flash hole 212 penetrates through the connection portion 216 and the bottom plate portion 214. The flash hole 212 is located on the outside of the mounting groove 2161. The flash hole 212 and the top plate portion 215 do not overlap. The camera hole 211 is disposed on the main body part 21, and the camera hole 211 penetrates through the top plate portion 215 and the bottom plate portion 214.

In some embodiments, as shown in FIG. 5 and FIG. 7, the top plate portion 215 is provided with a first through hole 2151. The top plate portion 215 forms an annular protrusion 2152 around a position of the first through hole 2151. The annular protrusion 2152 protrudes in a direction close to the bottom plate portion 214 and abuts against the bottom plate portion 214. The bottom plate portion 214 is provided with a second through hole 2141. The bottom plate portion 214 surrounds a position of the second through hole 2141 to form a limiting protrusion 2142. The second through hole 2141 is connected to the first through hole 2151, and the limiting protrusion 2142 is at least partially embedded within the annular protrusion 2152.

In this embodiment, the first through hole 2151 and the second through hole 2141 jointly form the camera hole 211 of the terminal protective case 200. The annular protrusion 2152 abuts against the bottom plate portion 214. This helps increase support strength between the top plate portion 215 and the bottom plate portion 214, and improve structural strength and pressure resistance performance of the main body part 21. Embedding fit between the limiting protrusion 2142 and the annular protrusion 2152 facilitates better mutual positioning and fastening between the top plate portion 215 and the bottom plate portion 214, and may also increase structural strength of the main body part 21. In addition, because the diaphragm 31 is directly fastened to the main body part 21, structural strength of the main body part 21 is increased. This helps reduce housing vibration caused by vibration of the diaphragm 31, so that the piezoelectric speaker can make sound normally, and structural reliability of the terminal protective case 200 can be also improved, thereby improving holding experience and use experience of a user.

In some embodiments, as shown in FIG. 5 and FIG. 7, the main body part 21 further includes one or more holders 217. One end of each holder 217 is fixedly connected to the bottom plate portion 214, and the other end is fixedly connected to the top plate portion 215. In this case, the one or more holders 217 help improve support strength and connection firmness between the top plate portion 215 and the bottom plate portion 214, so that overall structural strength of the main body part 21 is significantly improved, and structural reliability of the terminal protective case 200 is higher. In addition, the structural strength of the main body part 21 is improved, which is also conducive to normal sound-making of the piezoelectric speaker.

For example, the one or more holders 217 are integrally formed with the bottom plate portion 214, and are fastened to the top plate portion 215 in a manner of bonding or the like. In some other embodiments, the one or more holders 217 may be alternatively integrated with the top plate portion 215, and are fastened to the bottom plate portion 214 in a manner of bonding or the like. In some other embodiments, the one or more holders 217, the top plate portion 215, and the bottom plate portion 214 are fastened to each other in a manner of bonding or the like. In some other embodiments, there are a plurality of holders 217. At least one holder 217 is integrally formed with the bottom plate portion 214, and is fastened to the top plate portion 215 in a manner of bonding or the like. At least one holder 217 is integrally formed with the top plate portion 215, and is fastened to the bottom plate portion 214 in a manner of bonding or the like.

The one or more holders 217 may be disposed in a gap within the main body part 21, namely, space that is within the main body part 21 and that is not used to arrange another device. A specific arrangement location, an arrangement spacing, and an arrangement quantity of the holders 217, and a specific shape of the holders 217 are not strictly limited in this application. For example, the terminal protective case 200 may include a plurality of holders 217, and the plurality of holders 217 are arranged in an array at intervals, to support the top plate portion 215 and the bottom plate portion 214 evenly.

Figure 8:
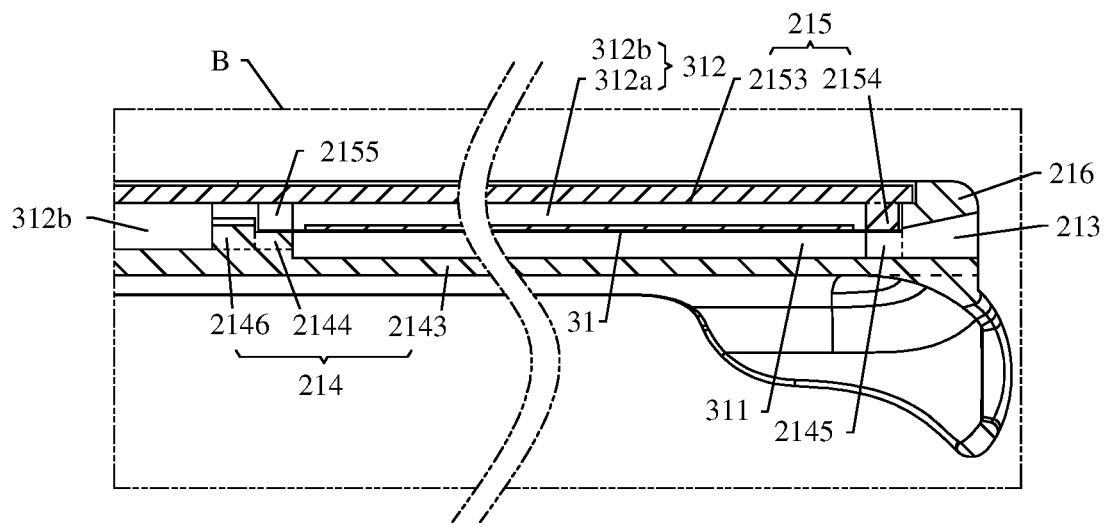
FIG. 8 is an enlarged view of a structure at a position B of the structure shown in FIG. 7.

Refer to FIG. 5 and FIG. 8 together, FIG. 8 is an enlarged view of a structure at a position B of the structure shown in FIG. 7.

In some embodiments, the sound outlet hole 213 is disposed on the connection portion 216 of the main body part 21. The sound outlet hole 213 penetrates through the connection portion 216, to connect inner space and outer space of the connection portion 216, that is, to connect space within the main body part 21 and space on the outside of the main body part 21. For example, there may be a plurality of sound outlet holes 213, and the plurality of sound outlet holes 213 are disposed at intervals. Each sound outlet hole 213 is roughly in a rectangular shape. In some other embodiments, there may be alternatively one sound outlet hole 213. In some other embodiments, the sound outlet hole 213 may be alternatively in another shape such as a circle or an ellipse. In this case, the terminal protective case 200 makes a sound from a side surface. When the terminal protective case 200 is held by a user or placed on an object, the sound outlet hole 213 is not easily blocked, so that the terminal protective case 200 can normally make a sound. This improves user experience.

For example, the sound outlet hole 213 may be roughly disposed at the bottom of the terminal protective case 200, for example, may be located near the connector hole 2223, so that when the user holds the audio playback system 1000, a risk that the sound outlet hole 213 is blocked is reduced, and user experience is improved.

In some other embodiments, the sound outlet hole 213 may be alternatively disposed on the top plate portion 215 of the main body part 21. Alternatively, the sound outlet hole 213 may be partially disposed on the connection portion 216 of the main body part 21, and partially disposed on the top plate portion 215 of the main body part 21. A position of the sound outlet hole 213 is not strictly limited in this application.

Figure 9:
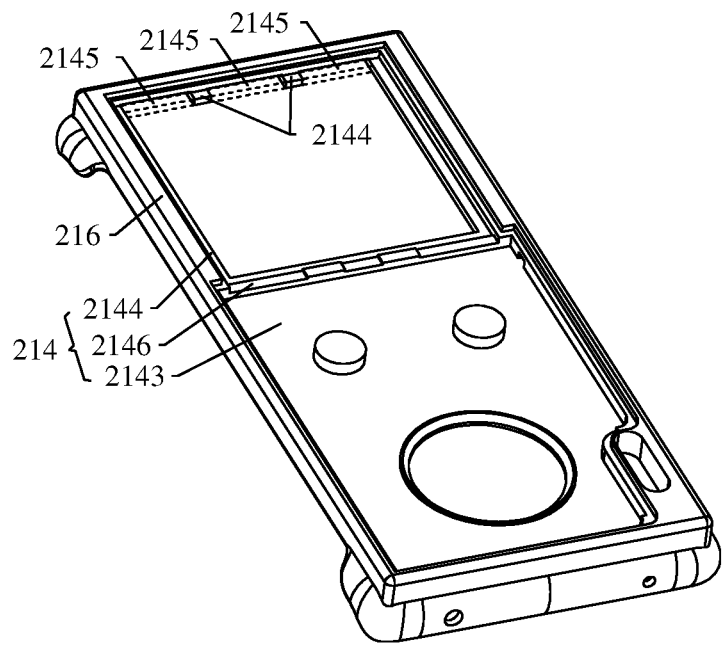
FIG. 9 is a schematic diagram of a structure of a main housing of the terminal protective case shown in FIG. 5.
Figure 10:
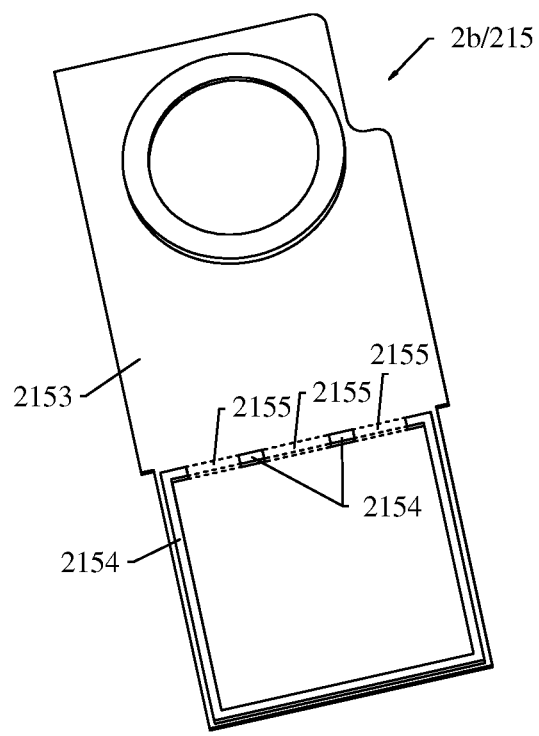
FIG. 10 is a schematic diagram of a structure of a cover plate of the terminal protective case shown in FIG. 5 in some embodiments.

Refer to FIG. 8 to FIG. 10 together. FIG. 9 is a schematic diagram of a structure of a main housing 2a of the terminal protective case 200 shown in FIG. 5, and FIG. 10 is a schematic diagram of a structure of a cover plate 2b of the terminal protective case 200 shown in FIG. 5 in some embodiments.

In some embodiments, as shown in FIG. 8 and FIG. 9, the bottom plate portion 214 includes a bottom plate body 2143 and a first protrusion 2144. The first protrusion 2144 is fastened on a side that is of the bottom plate body 2143 and that faces the top plate portion 215. As shown in FIG. 8 and FIG. 10, the top plate portion 215 includes a top plate body 2153 and a second protrusion 2154. The second protrusion 2154 is fastened on a side that is of the top plate body 2153 and that faces the bottom plate portion 214, and the second protrusion 2154 is disposed opposite to the first protrusion 2144. As shown in FIG. 8, a periphery of the diaphragm 31 is fastened between the first protrusion 2144 and the second protrusion 2154. The diaphragm 31 may be fastened to the first protrusion 2144 and the second protrusion 2154 in a manner of bonding or the like. The diaphragm 31 divides space within the main body part 21 into a front cavity 311 and a rear cavity 312 that are independent of each other. The front cavity 311 is formed on one side of the diaphragm 31, and the rear cavity 312 is formed on the other side of the diaphragm 31.

In this embodiment, the diaphragm 31 is fastened to the first protrusion 2144 and the second protrusion 2154, so that the diaphragm 31 is directly fastened to the main body part 21 of the housing 2. In this case, a front cavity 311 and a rear cavity 312 of the piezoelectric speaker are formed by using space in the main body part 21. This improves space utilization of the terminal protective case 200 and facilitates thinness of the terminal protective case 200.

In some embodiments, as shown in FIG. 8, the front cavity 311 is located between the diaphragm 31 and the bottom plate body 2143 and is located in the first protrusion 2144. First space 312a is formed between the diaphragm 31 and the top plate body 2153, and the first space 312a is located in the second protrusion 2154. Second space 312b is formed between the bottom plate body 2143 and the top plate body 2153, and the second space 312b is located on the outside of the second protrusion 2154. The second space 312b and the first space 312a are connected to form the rear cavity 312 of the piezoelectric loudspeaker. In this embodiment, space of the rear cavity 312 formed within the main body part 21 is large, so that the piezoelectric speaker has a good low-frequency sound pressure level. For example, with reference to FIG. 5 and FIG. 8, a breather hole 2162 (as shown in FIG. 5) is further disposed on the connection portion 216 of the main body part 21, and the second space 312b of the rear cavity 312 is connected to the outside of the main body part 21 through the breather hole 2162.

As shown in FIG. 8 and FIG. 9, the first protrusion 2144 is in a ring shape. A shape of the first protrusion 2144 adapts to a shape of the diaphragm 31, to better fasten the first protrusion 2144 to a periphery of the diaphragm 31. For example, the diaphragm 31 is rectangular, and the first protrusion 2144 is roughly in a rectangular ring shape. In some other embodiments, when the diaphragm 31 is in a circular shape, the first protrusion 2144 is roughly in a circular ring shape.

The first protrusion 2144 is provided with a first notch 2145, and the first notch 2145 connects the front cavity 311 and the sound outlet hole 213. There may be a plurality of first notches 2145, and the plurality of first notches 2145 are disposed at intervals. In this case, a portion that is of the first protrusion 2144 and that is located between the two adjacent first notches 2145 can still fasten the diaphragm 31, so that a connection area between the first protrusion 2144 and the diaphragm 31 is increased, and connection reliability between the first protrusion 2144 and the diaphragm 31 is higher. For example, when there are a plurality of sound outlet holes 213, the plurality of first notches 2145 are disposed in a one-to-one correspondence with the plurality of sound outlet holes 213; or when there is one sound outlet hole 213, the sound outlet hole 213 is connected to the plurality of first notches 2145. In some other embodiments, there may be alternatively one first notch 2145, and one first notch 2145 is connected to all sound outlet holes 213.

For example, as shown in FIG. 9, the first protrusion 2144 is fixedly connected to the inner side surface of the connection portion 216, to improve structural stability. For example, the first notch 2145 is located on a same side of the first protrusion 2144, and the other three sides of the first protrusion 2144 are continuously fastened to a periphery of the diaphragm 31, to improve connection reliability to the diaphragm 31. In this case, the diaphragm 31 better isolates the front cavity 311 from the rear cavity 312, so that the piezoelectric speaker has better sound quality.

As shown in FIG. 8 and FIG. 10, the second protrusion 2154 is in a ring shape. A shape of the second protrusion 2154 adapts to a shape of the diaphragm 31, to better fasten the second protrusion 2154 to a periphery of the diaphragm 31. For example, the diaphragm 31 is rectangular, and the second protrusion 2154 is roughly in a rectangular ring shape. In some other embodiments, when the diaphragm 31 is in a circular shape, the second protrusion 2154 is roughly in a circular ring shape.

The second protrusion 2154 is provided with a second notch 2155, and the second notch 2155 connects the first space 312a of the rear cavity 312 and the second space 312b of the rear cavity 312. There may be a plurality of second notches 2155, and the plurality of second notches 2155 are disposed at intervals. In this case, a portion that is of the second protrusion 2154 and that is located between the two adjacent second notches 2155 can still fasten the diaphragm 31, so that a connection area between the second protrusion 2154 and the diaphragm 31 is increased, and connection reliability between the second protrusion 2154 and the diaphragm 31 is higher. In some other embodiments, there may be one second notch 2155.

For example, as shown in FIG. 10, the second notch 2155 is located on a same side of the second protrusion 2154, and the other three sides of the second protrusion 2154 are continuously fastened to a periphery of the diaphragm 31, so that a connection between the diaphragm 31 and the second protrusion 2154 is more reliable.

Figure 11:
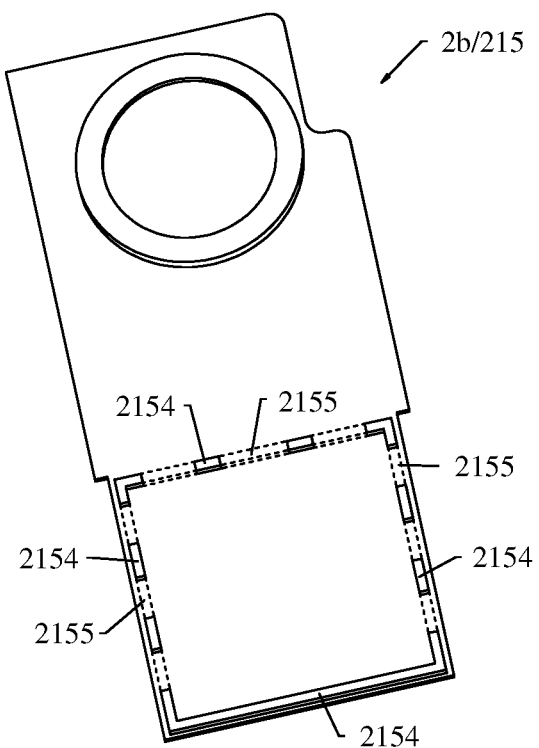
FIG. 11 is a schematic diagram of a structure of a cover plate of the terminal protective case shown in FIG. 5 in some other embodiments.

FIG. 11 is a schematic diagram of a structure of a cover plate 2b of the terminal protective case 200 shown in FIG. 5 in some other embodiments. When no conflict occurs, the cover plate 2b in this embodiment may include most features of the cover plate 2b in the foregoing embodiment. The following mainly describes differences between this embodiment and the foregoing embodiment, and most same content is not described again.

In some other embodiments, there are a plurality of second notches 2155, and the plurality of second notches 2155 are arranged at intervals on three sides of the second protrusion 2154. A side that is of the second protrusion 2154 and on which no notch is disposed is configured to directly face a side (refer to FIG. 9) on which a notch is disposed of the first protrusion 2144, to balance connection strength between each side of the diaphragm 31 and the main body part 21. In this way, the connection between the diaphragm 31 and the main body part 21 is firmer and more reliable.

It may be understood that, in the foregoing embodiment, the first notch 2145 and the second notch 2155 are configured to meet a spatial connection requirement. In addition to the foregoing embodiment, there may also be a plurality of other design manners for quantities and arrangement positions of the first notch 2145 and the second notch 2155. This is not strictly limited in this application.

In some embodiments, refer to FIG. 8 and FIG. 9 again, the bottom plate portion 214 may further include a limiting rib 2146, and the limiting rib 2146 is fastened to a side that is of the bottom plate body 2143 and that faces the top plate portion 215. The limiting rib 2146 is located on a side of the first protrusion 2144, and the limiting rib 2146 is higher than the first protrusion 2144. The limiting rib 2146 may be configured to limit or assist in limiting a position of the second protrusion 2154, so that positioning and fastening between the top plate portion 215 and the top plate portion 215 are more reliable. A gap is formed between the limiting rib 2146 and the top plate body 2153, where the limiting rib 2146 is away from all or a portion of the top surface of the bottom plate body 2143.

In some other embodiments, the limiting rib 2146 may not be disposed on the bottom plate portion 214, but a limiting structure is disposed on the top plate portion 215. The limiting structure is configured to limit a position of the first protrusion 2144.

In some other embodiments, positions of the front cavity and the rear cavity of the piezoelectric speaker may have different designs, for example: The front cavity is located between the diaphragm 31 and the top plate portion 215 and is located in the second protrusion 2154. A portion of the rear cavity is located between the diaphragm 31 and the bottom plate portion 214 and is located in the first protrusion 2144. The other portion of the rear cavity is located between the top plate portion 215 and the bottom plate portion 214 and is located on the outside of the first protrusion 2144. The two parts of the rear cavity 312 are connected to each other. In this case, the second protrusion 2154 is roughly in a ring shape, and the second notch of the second protrusion 2154 is configured to connect the front cavity to the sound outlet hole 213. The first protrusion 2144 is roughly in a ring shape, and the first notch of the first protrusion 2144 is configured to connect two parts of the rear cavity.

Figure 12:
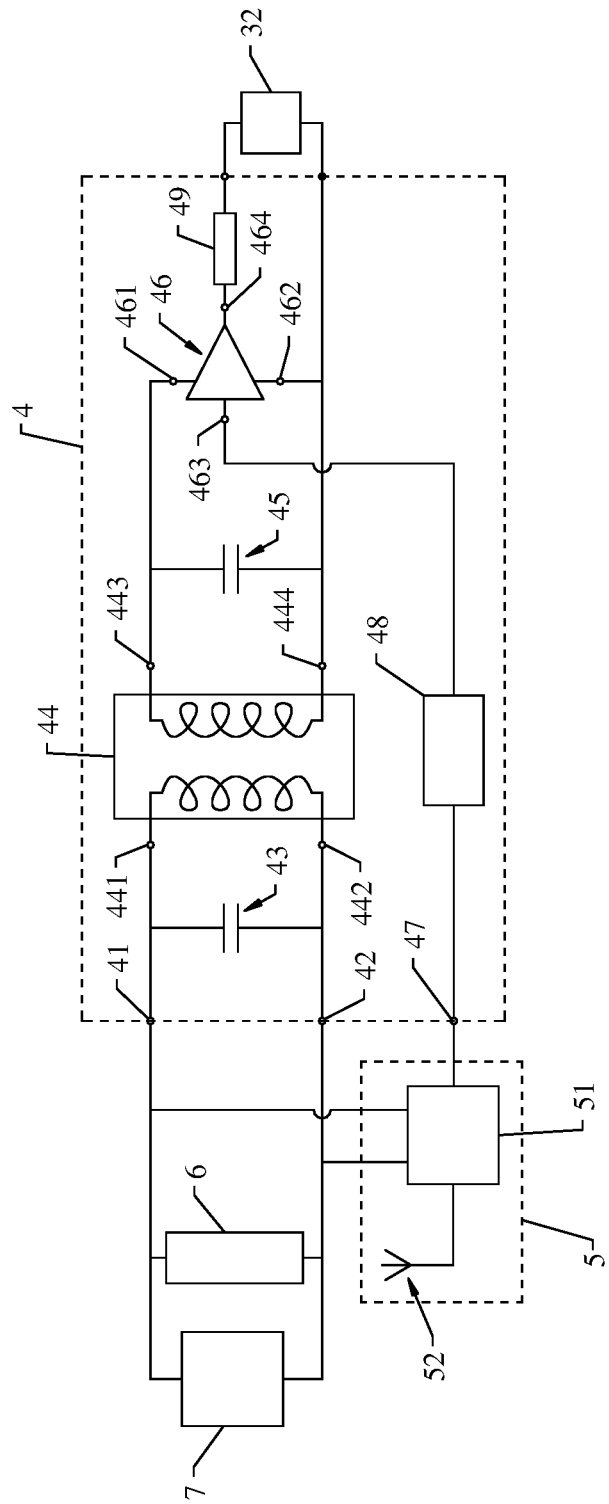
FIG. 12 is a schematic diagram of a portion of a circuit of the terminal protective case shown in FIG. 4.

Refer to FIG. 4 and FIG. 12 together. FIG. 12 is a schematic diagram of a portion of a circuit of the terminal protective case 200 shown in FIG. 4.

In some embodiments, the wireless communication module 5 is electrically connected to the drive circuit 4, and the wireless communication module 5 is configured to perform wireless communication with the terminal 100, to receive a communication signal of the terminal 100. For example, the wireless communication module 5 is configured to communicate with the wireless communication module 16 of the terminal 100 by using a wireless communication technology. The wireless communication technology may include but is not limited to a Bluetooth technology, an ultra-wideband technology, a wireless local area network technology, and the like. The wireless communication module 5 may include a radio frequency circuit 51 and an antenna 52 electrically connected to the radio frequency circuit 51. The antenna 52 is configured to convert a received electromagnetic wave into a radio frequency signal. The radio frequency circuit 51 is configured to demodulate the radio frequency signal into a baseband signal. In this case, the communication signal of the terminal 100 is an electromagnetic wave signal.

The battery 6 is electrically connected to the wireless communication module 5 and the drive circuit 4. The battery 6 is configured to supply power to the terminal protective case 200. A charging module 7 is electrically connected to the battery 6, and an external charging device charges the battery 6 through the charging module 7. For example, the charging module 7 may include an electrical connector, for example, a universal serial bus connector. As shown in FIG. 4, a charging socket 218 is disposed on the main body part 21, and the external charging device may be connected to the charging module 7 through the charging socket 218.

In this embodiment, the terminal protective case 200 communicates with the terminal 100 through wireless communication, and the battery 6 is disposed in the terminal protective case 200. Therefore, the terminal protective case 200 can work normally in a scenario in which the terminal protective case 200 is separated from the terminal 100. This improves user experience. For example, the terminal protective case 200 may be charged or play music after being detached from the terminal 100.

As shown in FIG. 12, in some embodiments, the drive circuit 4 includes a positive power interface 41, a negative power interface 42, a first capacitor 43, a boost circuit 44, a second capacitor 45, a power amplifier 46, a signal interface 47, a demodulator 48, and filtering matched impedance 49. For example, the positive power interface 41 is connected to a positive electrode of the battery 6, the negative power interface 42 is connected to a negative electrode of the battery 6, and the signal interface 47 is connected to the radio frequency circuit 51 of the wireless communication module 5.

The positive power interface 41 is connected to a first input terminal 441 of the boost circuit 44, and the negative power interface 42 is connected to a second input terminal 442 of the boost circuit 44. One terminal of the first capacitor 43 is connected between the positive power interface 41 and the first input terminal 441 of the boost circuit 44, and the other terminal of the first capacitor 43 is connected between the negative power interface 42 and the second input terminal 442 of the boost circuit 44. A first output terminal 443 of the boost circuit 44 is connected to a positive input terminal 461 of the power amplifier 46, and a second output terminal 444 of the boost circuit 44 is connected to a negative input terminal 462 of the power amplifier 46. One terminal of the second capacitor 45 is connected between the first output terminal 443 of the boost circuit 44 and the positive input terminal 461 of the power amplifier 46, and the other terminal of the second capacitor 45 is connected between the second output terminal 444 of the boost circuit 44 and the negative input terminal 462 of the power amplifier 46. The demodulator 48 is connected between the signal interface 47 and a signal input terminal 463 of the power amplifier 46, the demodulator 48 is configured to demodulate a signal (for example, a baseband signal) received by the signal interface 47 into an audio signal, and the power amplifier 46 is configured to amplify the audio signal and form a drive signal. The filtering matched impedance 49 is connected between an output terminal 464 of the power amplifier 46 and the piezoelectric sheet 32, and the filtering matched impedance 49 is configured to send the drive signal to the piezoelectric sheet 32 after filtering and attenuating the drive signal.

In this embodiment, the boost circuit 44 is configured to boost an output voltage of the battery 6 and then provide the output voltage to the power amplifier 46. The first capacitor 43 and the second capacitor 45 can regulate the output voltage of the battery 6 and an output voltage of the boost circuit 44, and are also configured to provide a large transient peak current, so as to meet a driving current requirement of the piezoelectric sheet 32 of the piezoelectric speaker.

For example, the battery 6 may provide an output voltage of 5 V. The first capacitor 43 is a supercapacitor. For example, a capacitance value of the first capacitor 43 may be 1 F (F). The boost circuit 44 may boost a voltage of 5 V to 25 V. The second capacitor 45 is a supercapacitor. For example, a capacitance value of the second capacitor 45 may be 0.2 F.

For example, the drive circuit 4 may further include a control unit (not shown in the figure). The control unit configures and controls a power link, a power amplifier link, and a data link of the drive circuit 4.

In some other embodiments, the power amplifier 46 in the drive circuit 4 may also be a smart power amplifier (smart power amplifier). In some other embodiments, the charging module 7 may alternatively include a wireless charging coil, and the external charging device charges the battery 6 through the charging module 7 by using a wireless charging technology. In this case, the charging socket may not be disposed on the main body part 21. In some other embodiments, the charging module 7 may further include a discharge circuit, and the battery 6 may supply power to the terminal 100 through the discharge circuit, to improve an endurance capability of the terminal 100.

In some embodiments, the terminal protective case 200 may further include a recording module (not shown in the figure) located within the main body part 21. The recording module can communicate with the terminal 100 through the wireless communication module 5. It may be understood that, in some other embodiments, a manner of communication between the recording module and the terminal 100 may change with a manner of communication between the drive circuit 4 and the terminal 100, to simplify hardware and a circuit of the terminal protective case 200.

Figure 13:
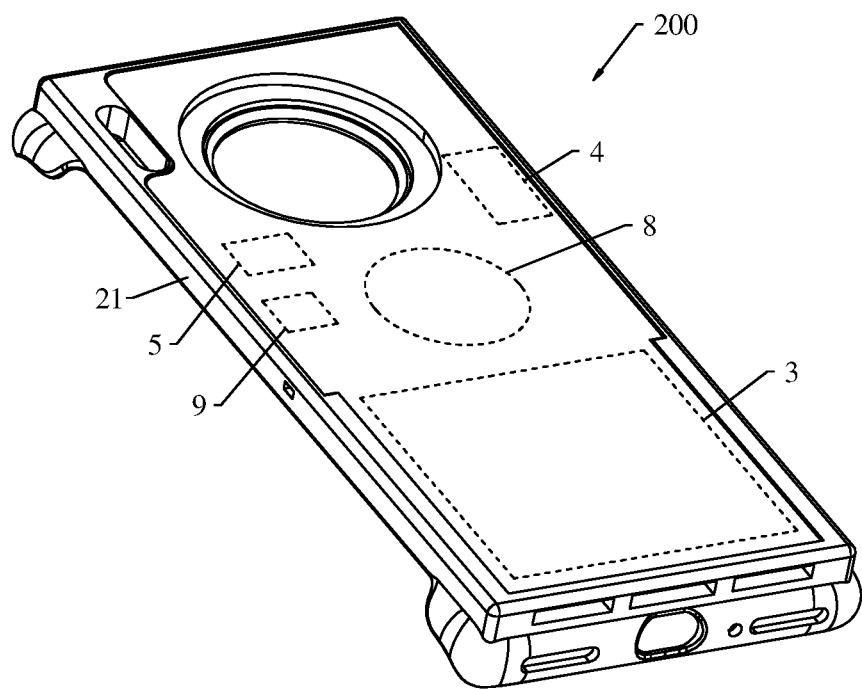
FIG. 13 is a schematic diagram of a structure of a terminal protective case of the audio playback system shown in FIG. 1 in some other embodiments.
Figure 14:
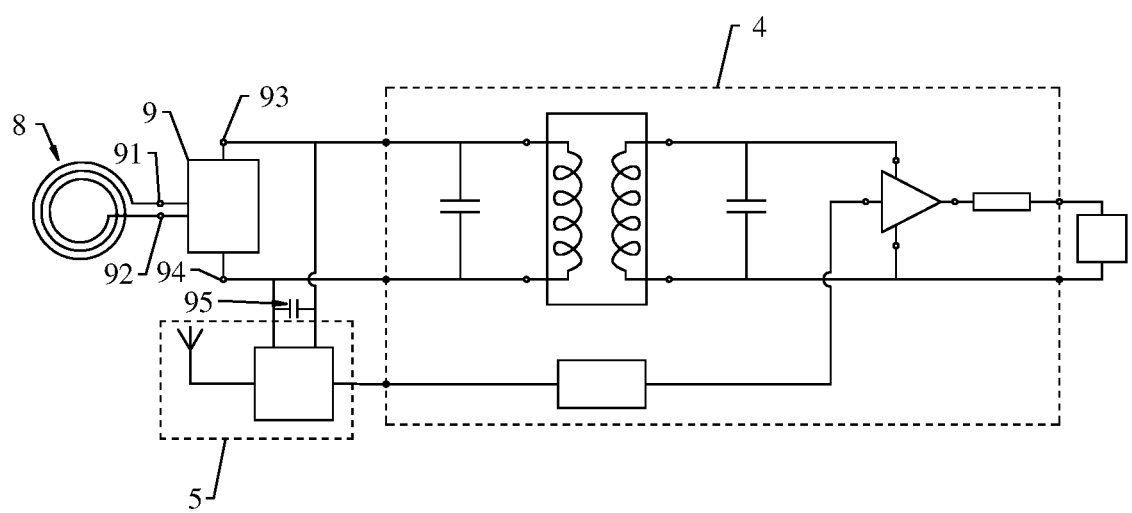
FIG. 14 is a schematic diagram of a portion of a circuit of the terminal protective case shown in FIG. 13.

Refer to both FIG. 13 and FIG. 14. FIG. 13 is a schematic diagram of a structure of the terminal protective case 200 of the audio playback system 1000 shown in FIG. 1 in some other embodiments, and FIG. 14 is a schematic diagram of a portion of a circuit of the terminal protective case 200 shown in FIG. 13. When no conflict occurs, the terminal protective case 200 in this embodiment may include most features of the terminal protective case 200 in the foregoing embodiment. The following mainly describes differences between this embodiment and the foregoing embodiment, and most same content is not described again. The terminal protective case 200 shown in FIG. 13 may sleeve the terminal 100 shown in FIG. 2.

In some embodiments, no battery is disposed in the terminal protective case 200, and instead, an external charging device directly supplies power to the terminal protective case 200 by using a wireless charging technology. For example, the terminal protective case 200 further includes a charging coil 8 and a wireless charging circuit 9 that are located within the main body part 21. Both the charging coil 8 and the wireless charging circuit 9 are located within the main body part 21. An input terminal of the wireless charging circuit 9 is connected to the charging coil 8, and an output terminal of the wireless charging circuit 9 is connected to the drive circuit 4 and the wireless communication module 5. The wireless charging circuit 9 is configured to: control the charging coil 8 to be coupled to a wireless charging coil 15 of the terminal 100, and supply power to the drive circuit 4 and the wireless communication module 5. The drive circuit 4 drives the piezoelectric speaker core 3 to work.

In this embodiment, no battery needs to be disposed in the terminal protective case 200, and the power supply is obtained by using a wireless charging technology. Compared with the foregoing embodiment, the charging coil 8 and the wireless charging circuit 9 in this embodiment are small in size and light in weight, thereby facilitating thinness and lightweight of the terminal protective case 200.

The wireless charging circuit 9 includes a positive input terminal 91 and a negative input terminal 92. The positive input terminal 91 and the negative input terminal 92 are respectively connected to two ends of the charging coil 8. The wireless charging circuit 9 further includes a positive output terminal 93 and a negative output terminal 94. The positive output terminal 93 is connected to the positive power interface 41 of the drive circuit 4, and the negative output terminal 94 is connected to the negative power interface 42 of the drive circuit 4.

A third capacitor 95 is further disposed between the output terminals (93 and 94) of the wireless charging circuit 9 and the wireless communication module 5, and two terminals of the third capacitor 95 are respectively connected to the positive output terminal 93 and the negative output terminal 94 of the wireless charging circuit 9. The third capacitor 95 is configured to regulate a power supply voltage transmitted by the wireless charging circuit 9 to the wireless communication module 5.

In some embodiments, the wireless charging circuit 9 can be further configured to control the charging coil 8 to be coupled to a wireless charging coil of another external charging device (for example, a power bank or a charging base), so that charging manners of the terminal protective case 200 are more diversified, and charging convenience is improved.

Figure 15:
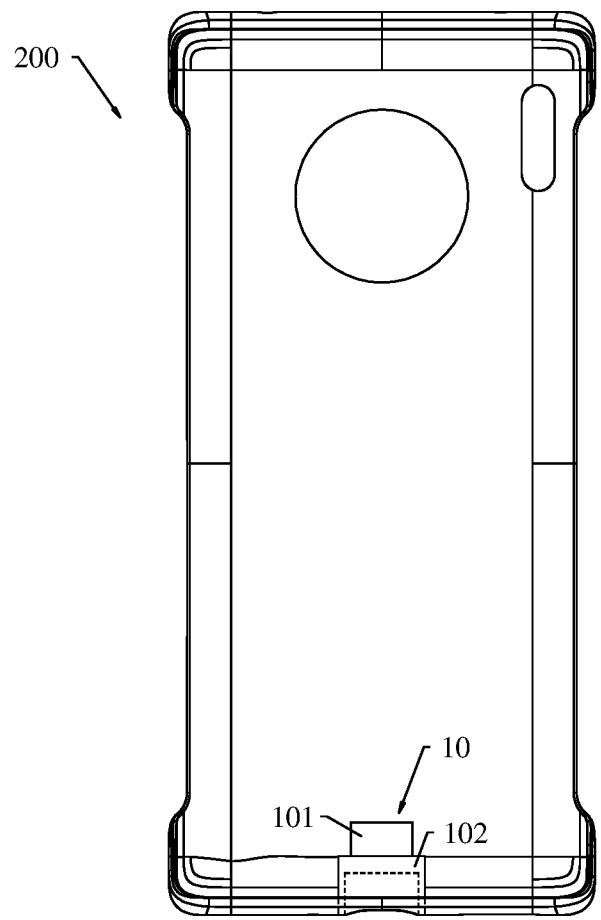
FIG. 15 is a schematic diagram of a structure of a terminal protective case of the audio playback system shown in FIG. 1 in still some other embodiments.
Figure 16:
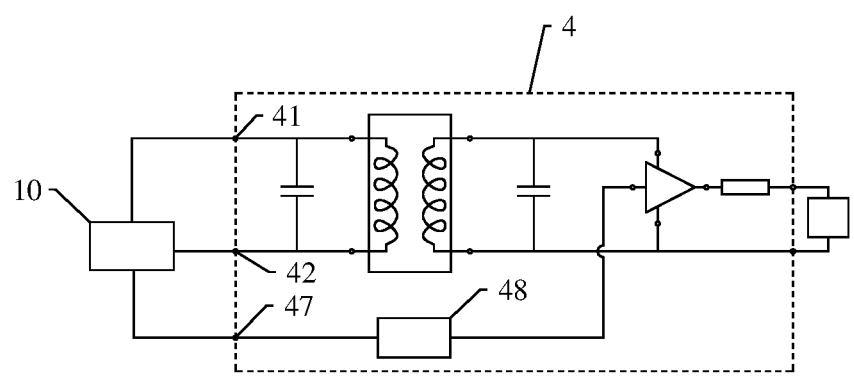
FIG. 16 is a schematic diagram of a portion of a circuit of the terminal protective case shown in FIG. 15.

Refer to both FIG. 15 and FIG. 16. FIG. 15 is a schematic diagram of a structure of the terminal protective case 200 of the audio playback system 1000 shown in FIG. 1 in still some other embodiments, and FIG. 16 is a schematic diagram of a portion of a circuit of the terminal protective case 200 shown in FIG. 15. When no conflict occurs, the terminal protective case 200 in this embodiment may include most features of the terminal protective case 200 in the foregoing embodiment. The following mainly describes differences between this embodiment and the foregoing embodiment, and most same content is not described again. The terminal protective case 200 shown in FIG. 15 may sleeve the terminal 100 shown in FIG. 2.

The terminal protective case 200 further includes an electrical connector 10. The electrical connector 10 is plugged in the connector 117 of the terminal 100. The drive circuit 4 is electrically connected to the electrical connector 10. A communication signal of the terminal 100 is transmitted to the drive circuit 4 through the connector 117 and the electrical connector 10. In this case, the communication signal of the terminal 100 is a universal serial bus signal, the signal interface 47 in the drive circuit 4 is connected to the electrical connector 10, and the demodulator 48 is configured to demodulate the universal serial bus signal into an audio signal.

In this embodiment, the terminal protective case 200 is directly connected to the connector 117 of the terminal 100 through the electrical connector 10, to obtain a communication signal of the terminal 100, so that quality of communication between the terminal protective case 200 and the terminal 100 is good.

For example, the terminal protective case 200 may not include a battery, and the terminal protective case 200 simultaneously obtains a power signal from the terminal 100 through the electrical connector 10. In this case, both the positive power interface 41 and the negative power interface 42 of the drive circuit 4 are connected to the electrical connector 10. In this embodiment, a battery and a related charging circuit do not need to be additionally disposed in the terminal protective case 200. This helps simplify a hardware structure and a circuit structure of the terminal protective case 200.

As shown in FIG. 15, the electrical connector 10 includes a male connector 101 and a female socket 102. An end of the male connector 101 is fixedly and electrically connected to the female socket 102. The male connector 101 is configured to plug in a connector 117 of the terminal 100. The female socket 102 projects from the terminal protective case 200. In this embodiment, another device (for example, a charger or a headset) may be electrically connected to the connector 117 of the terminal 100 by plugging in the female socket 102, to implement a communication connection and/or a power connection to the terminal 100.

Figure 17:
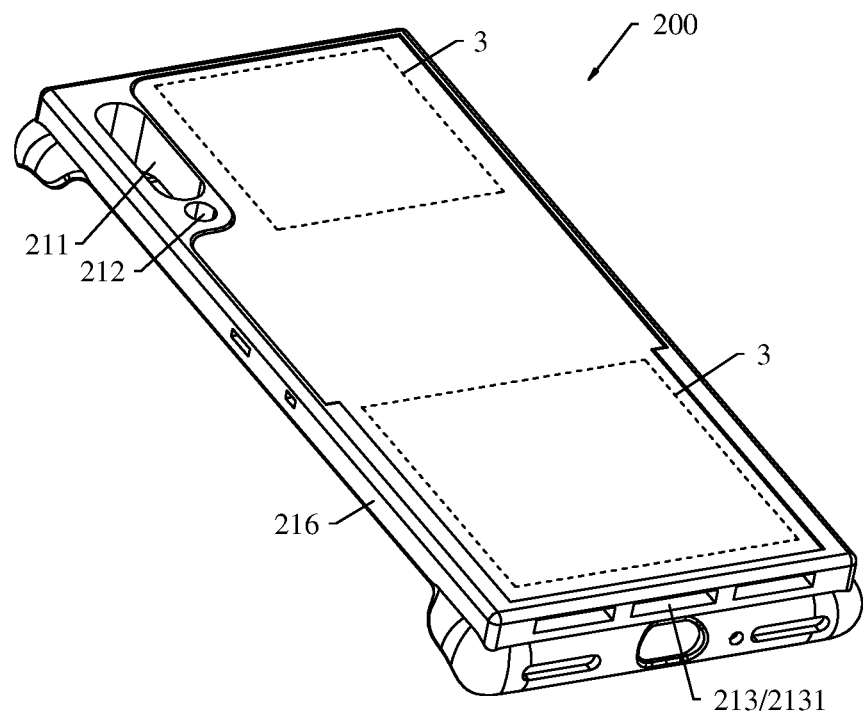
FIG. 17 is a schematic diagram of a structure of a terminal protective case of the audio playback system shown in FIG. 1 in yet some other embodiments.
Figure 18:
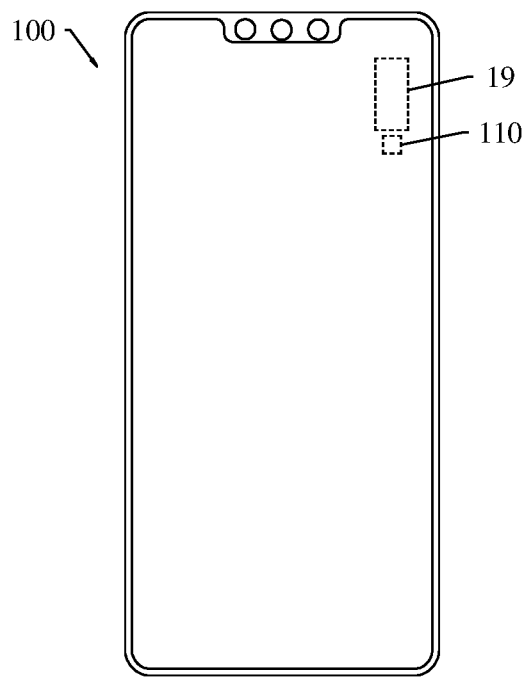
FIG. 18 is a schematic diagram of a structure of a terminal of the audio playback system shown in FIG. 1 in some other embodiments.

Refer to both FIG. 17 and FIG. 18. FIG. 17 is a schematic diagram of a structure of a terminal protective case 200 of the audio playback system 1000 shown in FIG. 1 in yet some other embodiments, and FIG. 18 is a schematic diagram of a structure of a terminal 100 of the audio playback system 1000 shown in FIG. 1 in some other embodiments. When no conflict occurs, the terminal 100 in this embodiment may include most features of the terminal 100 in the foregoing embodiment, and the terminal protective case 200 in this embodiment may include most features of the terminal protective case 200 in the foregoing embodiment. The following mainly describes differences between this embodiment and the foregoing embodiment, and most same content is not described again. The terminal protective case 200 shown in FIG. 17 may sleeve the terminal 100 shown in FIG. 18.

In some embodiments, the rear-facing camera module 19 of the terminal 100 is disposed at a position close to a side edge. In this case, the flash module no and the rear-facing camera module 19 may be arranged vertically or horizontally. The terminal protective case 200 includes a plurality of piezoelectric speaker cores 3. The plurality of piezoelectric speaker cores 3 may be spaced apart from each other. For example, the terminal protective case 200 includes two piezoelectric speaker cores 3, and the two piezoelectric speaker cores 3 are separately disposed close to the top and the bottom of the terminal protective case 200. The camera hole 211 and the flash hole 212 of the terminal protective case 200 are arranged close to a side edge of the terminal protective case 200, and positions of the camera hole 211 and the flash hole 212 correspond to positions of the rear-facing camera module 19 and the flash module no of the terminal 100.

In this embodiment, the plurality of piezoelectric speaker cores 3 are disposed in the terminal protective case 200, to form a plurality of piezoelectric speakers. Therefore, loudspeaker volume of the terminal protective case 200 and the audio playback system 1000 is significantly increased. This helps improve user experience.

In some other embodiments, the terminal protective case 200 may alternatively include at least three piezoelectric speaker cores 3. A quantity of the piezoelectric speaker cores 3 is not strictly limited in this application.

In some embodiments, front cavities of the plurality of piezoelectric speaker cores 3 (that is, front cavities of piezoelectric speakers) are connected to one or more same sound outlet holes. In this case, volume of sounds made by the plurality of piezoelectric speakers is superimposed. In some other embodiments, the front cavities of the plurality of piezoelectric speaker cores 3 (that is, front cavities of the piezoelectric speaker) are respectively connected to a plurality of sound outlet holes at different positions. In this case, the plurality of piezoelectric speakers may cooperate with each other to implement stereo. For example, one of the two piezoelectric speakers is connected to a sound outlet hole at the top of the terminal protective case 200 and is set as a left sound channel, and the other is connected to a sound outlet hole at the bottom of the terminal protective case 200 and is set as a right sound channel.

Figure 19:
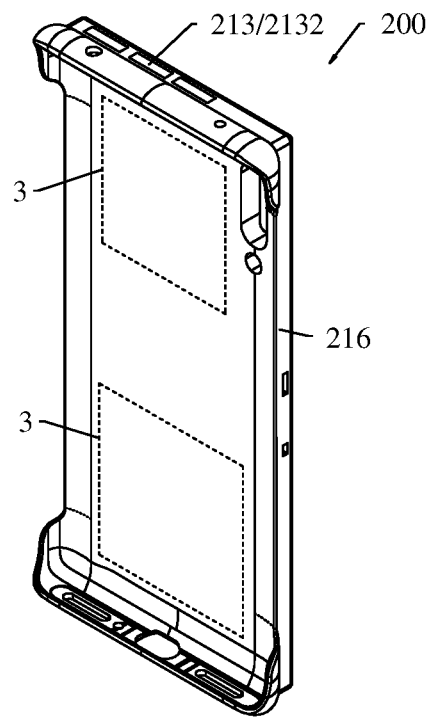
FIG. 19 is a schematic diagram of a structure of the terminal protective case shown in FIG. 17 from another angle.

Refer to FIG. 17 and FIG. 19 together. FIG. 19 is a schematic diagram of a structure of the terminal protective case 200 shown in FIG. 17 from another angle.

For example, the plurality of sound outlet holes 213 include a first sound outlet hole 2131 and a second sound outlet hole 2132. The first sound outlet hole 2131 and the second sound outlet hole 2132 are connected to front cavities of different piezoelectric speaker cores 3. The first sound outlet hole 2131 and the second sound outlet hole 2132 are respectively located at two ends of the connection portion 216. For example, the first sound outlet hole 2131 and the second sound outlet hole 2132 may be respectively located at the top and the bottom of the terminal protective case 200.

In this embodiment, a distance between the first sound outlet hole 2131 and the second sound outlet hole 2132 is long. This helps improve a stereo playback sound effect of the terminal protective case 200. It may be understood that, in both a landscape use scenario and a portrait use scenario, the terminal protective case 200 can implement stereo playback.

In some other embodiments, a quantity of piezoelectric speaker cores 3 may be alternatively greater than three or equal to three. This is not strictly limited in this application. It may be understood that, in this embodiment of this application, when there are a plurality of piezoelectric speaker cores 3, a related structure of the main body part 21 of the housing 2 is correspondingly adjusted, and the drive circuit 4 is also correspondingly adjusted. For example, the plurality of piezoelectric speaker cores 3 may have rear cavities independent of each other, or may share a rear cavity.

In some other embodiments, the rear-facing camera module 19 of the terminal 100 may also be arranged near a middle position or arranged in a middle position. In this case, a diaphragm with a small area may be disposed on some piezoelectric speaker cores 3 of the terminal protective case 200, so as to arrange the piezoelectric speaker cores 3 by using space around the camera hole 211 (corresponding to the rear-facing camera module 19). In this way, internal space of the terminal protective case 200 is fully used, and there can be a large spacing between a plurality of piezoelectric speakers, to improve a stereo sound effect. In other words, the terminal protective case 200 may include a plurality of piezoelectric speaker cores 3 with different diaphragm areas. It may be understood that there may be a plurality of design solutions for a position of the camera hole 211 of the terminal protective case 200, a size of the camera hole 211, a diaphragm area relationship of the plurality of piezoelectric speaker cores 3, and an arrangement position relationship of the plurality of piezoelectric speaker cores 3, and the solutions are not limited to the foregoing solutions.

Figure 20:
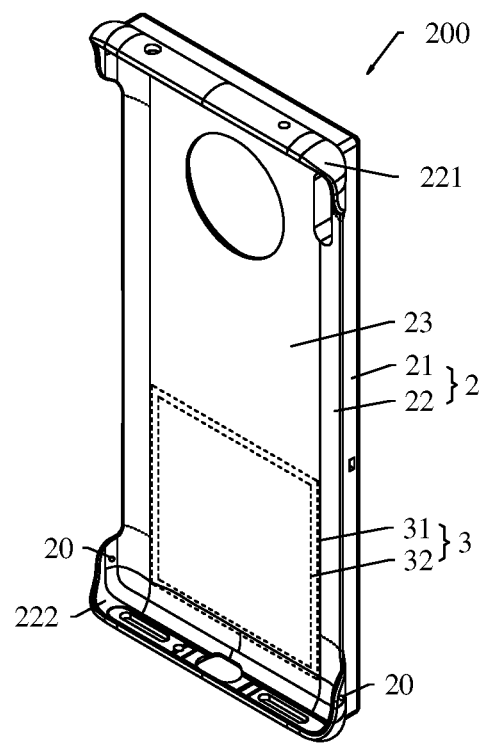
FIG. 20 is a schematic diagram of a structure of a terminal protective case of the audio playback system shown in FIG. 1 in still yet some other embodiments.
Figure 21:
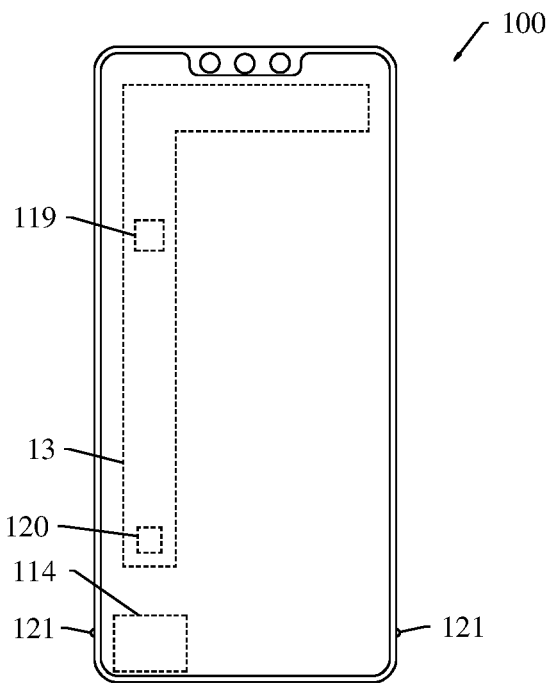
FIG. 21 is a schematic diagram of a structure of a terminal of the audio playback system shown in FIG. 1 in still some other embodiments.

Refer to both FIG. 20 and FIG. 21. FIG. 20 is a schematic diagram of a structure of a terminal protective case 200 of the audio playback system 1000 shown in FIG. 1 in still yet some other embodiments, and FIG. 21 is a schematic diagram of a structure of a terminal 100 of the audio playback system 1000 shown in FIG. 1 in still some other embodiments. When no conflict occurs, the terminal 100 in this embodiment may include most features of the terminal 100 in the foregoing embodiment, and the terminal protective case 200 in this embodiment may include most features of the terminal protective case 200 in the foregoing embodiment. The following mainly describes differences between this embodiment and the foregoing embodiment, and most same content is not described again. The terminal protective case 200 shown in FIG. 20 may sleeve the terminal 100 shown in FIG. 21.

In some embodiments, the terminal protective case 200 includes a housing 2, a diaphragm 31, a piezoelectric sheet 32, and a first conductive contact 20. The housing 2 includes a main body part 21, a fastening frame part 22, and an accommodating groove 23 jointly encircled by the fastening frame part 22 and the main body part 21. The diaphragm 31 is located within the main body part 21, and the piezoelectric sheet 32 is fastened to the diaphragm 31. The first conductive contact 20 is fastened on the fastening frame part 22 and projects from the accommodating groove 23. The first conductive contact 20 is electrically connected to the piezoelectric sheet 32.

The terminal 100 may be accommodated in the accommodating groove 23 of the terminal protective case 200, and the terminal 100 and the terminal protective case 200 jointly form the audio playback system 1000. The terminal 100 further includes a drive circuit 120 and a second conductive contact 121 that is electrically connected to the drive circuit 120. The drive circuit 120 may be fastened to the circuit board 13, and the drive circuit 120 is coupled to a processor 119. The drive circuit 120 is configured to convert an audio signal into a drive signal. The second conductive contact 121 partially or totally projects from the terminal 100. When the terminal 100 is accommodated in the accommodating groove 23, the second conductive contact 121 abuts against the first conductive contact 20. The drive signal formed by the drive circuit 120 is transmitted to the piezoelectric sheet 32 through the second conductive contact 121 and the first conductive contact 20, to drive the piezoelectric sheet 32 to drive the diaphragm 31 to vibrate.

In this embodiment, the terminal 100 may transmit the drive signal to the piezoelectric sheet 32 of the terminal protective case 200, to drive the piezoelectric sheet 32 to drive the diaphragm 31 to vibrate. Therefore, the piezoelectric speaker of the terminal protective case 200 may make a sound under control of the terminal 100. The piezoelectric speaker of the terminal protective case 200 may make a sound together with the speaker 114 of the terminal 100 to greatly increase loudspeaker volume of the audio playback system 1000. In other words, the audio playback system 1000 has high loudspeaker volume, and the audio playback system 1000 still has a good loudspeaker effect in a noisy environment or an outdoor environment. In addition, the terminal 100 can control, by using the drive signal, the piezoelectric speaker of the terminal protective case 200 to make a sound or not to make a sound, so that the audio playback system 1000 can implement a plurality of loudspeaker modes, such as making a sound by the terminal protective case 200 alone, making a sound by the terminal 100 alone, and making a sound by the terminal protective case 200 and the terminal 100 together. In addition, when the piezoelectric speaker of the terminal protective case 200 and the speaker 114 of the terminal 100 make a sound together, the piezoelectric speaker and the speaker of the terminal may cooperate to form a multi-channel loudspeaker system. This improves sound field rendering and a stereo effect.

In this embodiment, because the piezoelectric sheet 32 of the piezoelectric speaker of the terminal protective case 200 is directly driven by the drive signal sent by the terminal 100, a structure such as a battery, a charging circuit, or a piezoelectric sheet drive circuit does not need to be disposed on the terminal protective case 200. Therefore, the terminal protective case 200 has a simple structure and low costs.

In some embodiments, the first conductive contact 20 may be of a protrusion structure, a dome structure, or a pad structure, and the first conductive contact 20 may be made of a material such as metal. The second conductive contact 121 may be of a protrusion structure, a dome structure, or a pad structure, and the first conductive contact 20 may be made of a material such as metal.

In some embodiments, there are two first conductive contacts 20, and the two first conductive contacts 20 may be relatively fastened on two sides of the bottom frame part 222 of the fastening frame part 22. In this case, there are also two second conductive contacts 121, and the two second conductive contacts 121 are respectively fixed on two sides of the frame of the terminal 100.

In some other embodiments, the two first conductive contacts 20 may also be fastened on two sides of the top frame part 221 of the fastening frame part 22, or the two first conductive contacts 20 may be alternatively fastened on a same side of the top frame part 221 or the bottom frame part 222 of the fastening frame part 22. In this case, the position of the second conductive contact 121 of the terminal 100 is adaptively adjusted. In some other embodiments, the first conductive contact 20 may be alternatively fastened to the main body part 21, and the second conductive contact 121 may be alternatively fastened to the rear cover of the terminal 100. In some other embodiments, one of the two first conductive contacts 20 may be alternatively fastened to the fastening frame part 22 and the other may be fastened to the main body part 21. Positions of the two second conductive contacts 121 of the terminal 100 are adaptively adjusted.

In some other embodiments, there may also be one first conductive contact 20, and the first conductive contact 20 includes a positive input terminal and a negative input terminal. In this case, there is also one second conductive contact 121, and the second conductive contact 121 includes a positive output terminal and a negative output terminal. In some other embodiments, there may also be three or another quantity of first conductive contacts 20, which may be designed according to a drive signal requirement of the piezoelectric sheet 32. It may be understood that a specific quantity and arrangement locations of the first conductive contacts 20 are not strictly limited in this embodiment of this application, and a quantity and locations of the second conductive contacts 121 are adaptively adjusted and designed according to the first conductive contact 20.

In some other embodiments, the terminal protective case 200 and the terminal 100 may further include one or more other conductive contact groups that may abut against each other. For example, the terminal protective case 200 may further include a third conductive contact electrically connected to the recording module. The terminal 100 may further include a fourth conductive contact configured to abut against the third conductive contact, and the fourth conductive contact is coupled to the processor 119.

Figure 22:
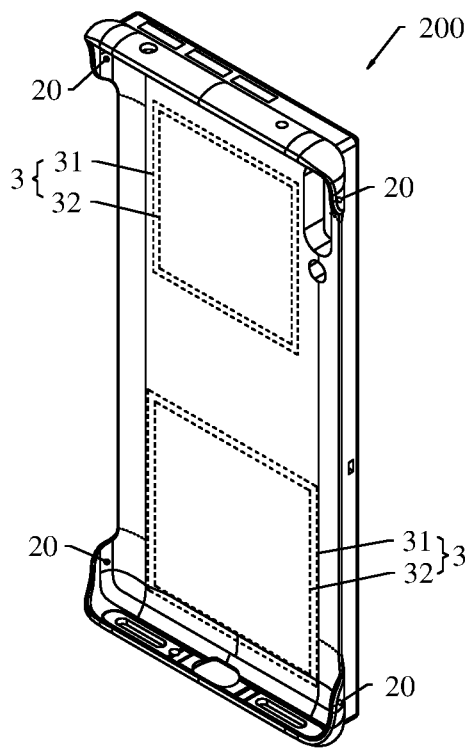
FIG. 22 is a schematic diagram of a structure of a terminal protective case of the audio playback system shown in FIG. 1 in some further embodiments.
Figure 23:
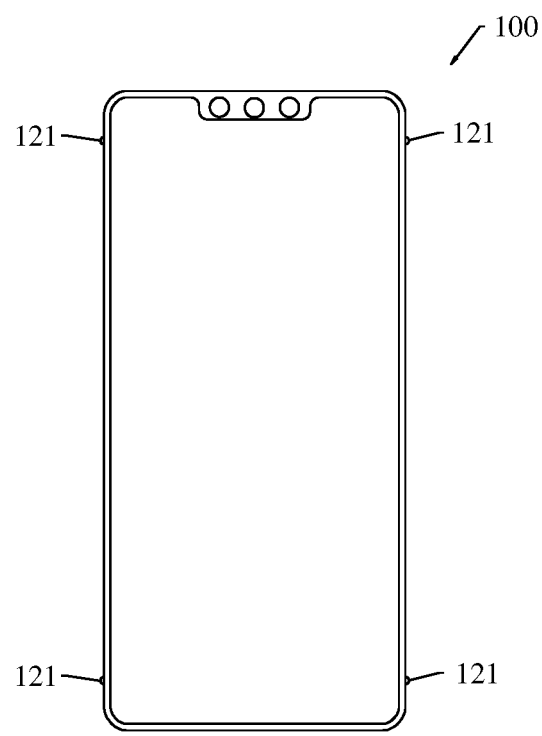
FIG. 23 is a schematic diagram of a structure of a terminal of the audio playback system shown in FIG. 1 in yet some other embodiments.

Refer to both FIG. 22 and FIG. 23. FIG. 22 is a schematic diagram of a structure of a terminal protective case 200 of the audio playback system 1000 shown in FIG. 1 in some further embodiments, and FIG. 23 is a schematic diagram of a structure of a terminal 100 of the audio playback system 1000 shown in FIG. 1 in yet some other embodiments. When no conflict occurs, the terminal 100 in this embodiment may include most features of the terminal 100 in the foregoing embodiment, and the terminal protective case 200 in this embodiment may include most features of the terminal protective case 200 in the foregoing embodiment. The following mainly describes differences between this embodiment and the foregoing embodiment, and most same content is not described again. The terminal protective case 200 shown in FIG. 22 may sleeve the terminal 100 shown in FIG. 23.

In some embodiments, the terminal protective case 200 includes a plurality of piezoelectric speaker cores 3 located within the main body part 21. Each piezoelectric speaker core 3 includes a diaphragm 31 and a piezoelectric sheet 32 fastened to the diaphragm 31. The terminal protective case 200 further includes a plurality of groups of first conductive contacts 20, and the plurality of groups of first conductive contacts 20 are respectively connected to piezoelectric sheets 32 of a plurality of piezoelectric speaker cores 3. The terminal 100 includes a plurality of groups of second conductive contacts 121 that are connected to the plurality of groups of first conductive contacts 20 in a one-to-one correspondence manner.

For example, the terminal protective case 200 includes two piezoelectric speaker cores 3 and two groups of first conductive contacts 20. The two piezoelectric speaker cores 3 are respectively disposed close to the top and the bottom of the terminal protective case 200. The two groups of first conductive contacts 20 are respectively disposed close to the top and the bottom of the terminal protective case 200. The terminal 100 includes two groups of second conductive contacts 121, and the two groups of second conductive contacts 121 are respectively disposed near the top and the bottom of the terminal 100.

In some embodiments, the front cavities of the plurality of piezoelectric speaker cores 3 may be connected to one or more same sound outlet holes. In this case, volume of sounds made by the plurality of piezoelectric speakers is superimposed. In some other embodiments, the front cavities of the plurality of piezoelectric speaker cores 3 (that is, front cavities of the piezoelectric speaker) are respectively connected to a plurality of sound outlet holes at different positions. In this case, the plurality of piezoelectric speakers may cooperate with each other to implement stereo.

Figure 24:
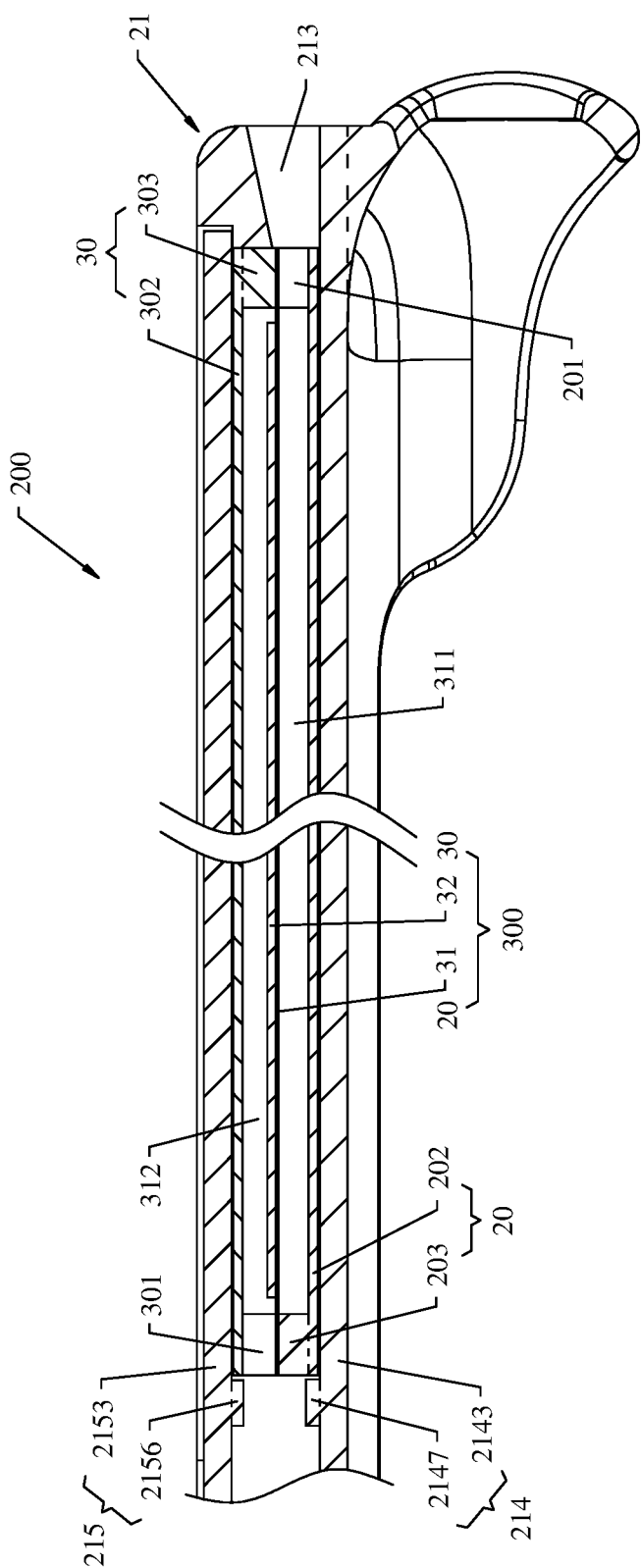
FIG. 24 is a schematic diagram of an internal structure of a terminal protective case of the audio playback system shown in FIG. 1 in still some further embodiments.

FIG. 24 is a schematic diagram of an internal structure of a terminal protective case 200 of the audio playback system 1000 shown in FIG. 1 in still some further embodiments. When no conflict occurs, the terminal protective case 200 in this embodiment may include most features of the terminal protective case 200 in the foregoing embodiment. The following mainly describes differences between this embodiment and the foregoing embodiment, and most same content is not described again. The protective case in this embodiment may be used together with any one of the foregoing terminals 100.

In some embodiments, the terminal protective case 200 further includes a first cover body 20 and a second cover body 30 that are located within the main body part 21. The first cover body 20 and the second cover body 30 are disposed opposite to each other, and a periphery of the diaphragm 31 is fastened between the first cover body 20 and the second cover body 30. A front cavity 311 is formed between the diaphragm 31 and the first cover body 20, a connection hole 201 is disposed on the first cover body 20, and the connection hole 201 connects the front cavity 311 to the sound outlet hole 213. A rear cavity 312 is formed between the diaphragm 31 and the second cover body 30, a leakage hole 301 is disposed on the second cover body 30, and the leakage hole 301 connects the rear cavity 312 to the outside of the second cover body 30.

In this embodiment, the first cover body 20, the second cover body 30, the diaphragm 31, and the piezoelectric sheet 32 jointly form the piezoelectric speaker 300. The piezoelectric speaker 300 may be first formed in the terminal protective case 200, and then the piezoelectric speaker 300 is mounted into the main body part 21, to reduce assembly difficulty of the terminal protective case 200. In this way, a product yield of the terminal protective case 200 is high. In addition, when the piezoelectric speaker 300 is independently assembled into a module, assembly precision of the piezoelectric speaker 300 is also ensured, so that the piezoelectric speaker 300 has a higher product yield.

It may be understood that, compared with the foregoing embodiment, in this embodiment, a first protrusion may not be disposed on the bottom plate portion 214 of the main body part 21, and a second protrusion may not be disposed on the top plate portion 215. To improve positioning and fastening reliability between the piezoelectric speaker 300 and the main body part 21, the bottom plate portion 214 may further include a first limiting piece 2147 fastened to the bottom plate body 2143. The top plate portion 215 may further include a second limiting piece 2156 fastened to the top plate body 2153. Both the second limiting piece 2156 and the first limiting piece 2147 are configured to limit the piezoelectric speaker 300.

In some embodiments, the leakage hole 301 is disposed near middle space of the main body part 21, so that the rear cavity 312 is connected to space that is within the main body part 21, that is located between the top plate portion 215 and the bottom plate portion 214, and that is located on the outside of the second cover body 30. In this way, the space is used to expand space of the rear cavity 312 of the piezoelectric speaker 300 and improve a low-frequency sound pressure level of the piezoelectric speaker 300. In this case, the rear cavity of the piezoelectric speaker 300 is an open rear cavity. In some other embodiments, the leakage hole may be alternatively disposed close to an edge of the main body part 21, that is, a connection portion facing the main body part 21, so that the leakage hole is directly connected to the outside of the main body part 21 through a breather hole 2162 (refer to FIG. 4) of the connection portion. For example, the leakage hole of the second cover body 30 is disposed opposite to the breather hole 2162.

For example, the first cover body 20 may be located between the diaphragm 31 and the bottom plate portion 214 of the main body part 21. The second cover body 30 may be located between the diaphragm 31 and the top plate portion 215 of the main body part 21. The connection hole 201 of the first cover body 20 is close to and opposite to the sound outlet hole 213.

In some embodiments, the first cover body 20 includes a body 202 and a fastening frame 203 fastened on a periphery of the body 202. The second cover body 30 includes a body 302 and a fastening frame 303 fastened on a periphery of the body 302. The fastening frame 203 of the first cover body 20 and the fastening frame 303 of the second cover body 30 are respectively fastened on two sides of a periphery of the diaphragm 31. The connection hole 201 is disposed on the fastening frame 203 of the first cover body 20, and the leakage hole 301 is disposed on the fastening frame 303 of the second cover body 30.

In this embodiment, because the piezoelectric speaker 300 has a small overall thickness, when the terminal protective case 200 forms the piezoelectric speaker 300, a thickness of the main body part 21 of the terminal protective case may be controlled within a small range. In this case, when the terminal protective case 200 sleeves the outside of the terminal 100, a hand holding feeling and portability of a user are improved.

Generally, the overall thickness of the piezoelectric speaker 300 may be controlled to be less than 5 millimeters or less than 4 millimeters. For example, a thickness of the body 202 of the first cover body 20 may be 0.5 millimeter, a height of the front cavity 311 may be 1 millimeter, a thickness of the piezoelectric sheet 32 may be 0.27 millimeter, a thickness of the diaphragm 31 may be 0.15 millimeter, a height of the rear cavity 312 may be 1 millimeter, and a thickness of the body 302 of the second cover body 30 may be 0.5 millimeter. In this case, the overall thickness of the piezoelectric speaker 300 is 3.42 millimeters.

In some embodiments, the first cover body 20 and the second cover body 30 are made of a hard material, for example, a steel sheet with a thickness of 0.4 millimeter to 0.5 millimeter may be selected. The material and the thickness of the first cover body 20 and the second cover body 30 are not strictly limited in this application.

It may be understood that the first cover body 20 and the second cover body 30 jointly form a speaker housing of the piezoelectric speaker 300. When the terminal protective case 200 includes a plurality of piezoelectric speaker cores 3, the terminal protective case 200 also includes a plurality of speaker housings. The plurality of speaker housings are configured to accommodate and fasten the plurality of piezoelectric speaker cores 3 in a one-to-one correspondence manner, to form the plurality of piezoelectric speakers 300.

The foregoing descriptions are merely specific implementations of this application, but are not intended to limit the protection scope of this application. Any variation or replacement readily figured out by a person skilled in the art within the technical scope disclosed in this application shall fall within the protection scope of this application. When no conflict occurs, embodiments of this application and the features in the embodiments may be mutually combined. Therefore, the protection scope of this application shall be subject to the protection scope of the claims.

What is claimed is:

1. A terminal protective case, comprising:
  a housing;
  a diaphragm;
  a piezoelectric sheet;
  a drive circuit; and
  an electrical connector electrically connected to the drive circuit;
  wherein the housing comprises a main body part and a fastening frame part, wherein a side of the fastening frame part is fastened to a periphery of the main body part, wherein the fastening frame part and the main body part jointly enclose an accommodating groove, and wherein the accommodating groove is configured to accommodate a terminal;
  wherein the diaphragm is located within the main body part, wherein the piezoelectric sheet is fastened to the diaphragm, wherein a front cavity is on a side of the diaphragm, wherein a sound outlet hole is disposed on the main body part, and wherein the sound outlet hole connects the front cavity to the outside of the main body part;
  wherein the drive circuit is located within the main body part and is electrically connected to the piezoelectric sheet, and wherein the drive circuit is configured to drive, in response to a communication signal of the terminal, the piezoelectric sheet to cause the diaphragm to vibrate; and
  wherein the electrical connector is configured to plug into a connector of the terminal such that the communication signal of the terminal is transmitted to the drive circuit through the connector of the terminal and through the electrical connector.

2. The terminal protective case according to claim 1, wherein the main body part comprises a bottom plate portion, a top plate portion, and a connection portion, wherein the bottom plate portion and the top plate portion are disposed opposite to each other, wherein the connection portion is connected between a periphery of the bottom plate portion and a periphery of the top plate portion, and wherein the fastening frame part is connected to at least one of the bottom plate portion or the connection portion; and
  wherein the sound outlet hole is disposed on the connection portion.

3. The terminal protective case according to claim 2, wherein the bottom plate portion comprises a bottom plate body and a first protrusion, wherein the first protrusion is fastened to a side of the bottom plate body that faces the top plate portion, wherein the top plate portion comprises a top plate body and a second protrusion, wherein the second protrusion is fastened to a side of the top plate body that faces the bottom plate portion, wherein the second protrusion is disposed opposite the first protrusion, and wherein a periphery of the diaphragm is fastened between the first protrusion and the second protrusion.

4. The terminal protective case according to claim 3, wherein the main body part further comprises one or more holders, wherein one end of each holder of the one or more holders is fixedly connected to the bottom plate portion, and wherein the other end is fixedly connected to the top plate portion.

5. The terminal protective case according to claim 3, wherein the front cavity is located in the first protrusion between the diaphragm and the bottom plate body, wherein the first protrusion has a ring shape, wherein the first protrusion has a first notch, and wherein the first notch connects the front cavity and the sound outlet hole; and
  wherein a first space is disposed between the diaphragm and the top plate body, wherein the first space is located in the second protrusion, wherein a second space is disposed between the bottom plate body and the top plate body, wherein the second space is located on the outside of the second protrusion, wherein the second protrusion has a ring shape, wherein the second protrusion has a second notch, and wherein the second notch connects the second space and the first space to form a rear cavity.

6. The terminal protective case according to claim 2, wherein the terminal protective case further comprises a first cover body and a second cover body that are located within the main body part, wherein the first cover body and the second cover body are disposed opposite each other, and wherein a periphery of the diaphragm is fastened between the first cover body and the second cover body; and wherein the front cavity is disposed between the diaphragm and the first cover body, wherein a connection hole is disposed on the first cover body, wherein the connection hole connects the front cavity and the sound outlet hole, wherein a rear cavity is disposed between the diaphragm and the second cover body, wherein a leakage hole is disposed on the second cover body, and wherein the leakage hole connects the rear cavity to the outside of the second cover body.

7. The terminal protective case according to claim 2, wherein the diaphragm and the piezoelectric sheet form a piezoelectric speaker core, wherein the terminal protective case comprises a plurality of piezoelectric speaker cores, and wherein front cavities of the plurality of piezoelectric speaker cores are respectively connected to a plurality of sound outlet holes on different positions.

8. The terminal protective case according to claim 7, wherein the plurality of sound outlet holes comprise a first sound outlet hole and a second sound outlet hole, the first sound outlet hole and the second sound outlet hole are connected to front cavities of different piezoelectric speaker cores, and wherein the first sound outlet hole and the second sound outlet hole are respectively located at two ends of the connection portion.

9. The terminal protective case according to claim 1, wherein the electrical connector comprises a male connector and a female socket, wherein one end of the male connector is fixedly and electrically connected to the female socket, and wherein the female socket projects from the terminal protective case.

10. The terminal protective case according to claim 1, wherein the terminal protective case further comprises a wireless communication module and a battery that are located within the main body part, wherein the wireless communication module is electrically connected to the drive circuit, wherein the wireless communication module is configured to perform wireless communication with the terminal and to receive the communication signal of the terminal, and wherein the battery is electrically connected to the wireless communication module and the drive circuit.

11. The terminal protective case according to claim 1 wherein the terminal protective case further comprises a wireless communication module, a charging coil, and a wireless charging circuit that are located within the main body part;
wherein the wireless communication module is electrically connected to the drive circuit, and wherein the wireless communication module is configured to perform wireless communication with the terminal and to receive the communication signal of the terminal; and
wherein an input terminal of the wireless charging circuit is connected to the charging coil, wherein an output terminal of the wireless charging circuit is connected to the drive circuit and the wireless communication module, and wherein the wireless charging circuit is configured to control the charging coil to be coupled to a charging coil of the terminal, and is further configured to supply power to the drive circuit and the wireless communication module.

12. The terminal protective case according to claim 1, wherein the drive circuit comprises a positive power interface, a negative power interface, a first capacitor, a boost circuit, a second capacitor, a power amplifier, a signal interface, a demodulator, and filtering matched impedance;
wherein the positive power interface is connected to a first input terminal of the boost circuit, and wherein the negative power interface is connected to a second input terminal of the boost circuit;
wherein one terminal of the first capacitor is connected between the positive power interface and the first input terminal of the boost circuit, and wherein the other terminal of the first capacitor is connected between the negative power interface and the second input terminal of the boost circuit;
wherein a first output terminal of the boost circuit is connected to a positive input terminal of the power amplifier, and wherein a second output terminal of the boost circuit is connected to a negative input terminal of the power amplifier;
wherein one terminal of the second capacitor is connected between the first output terminal of the boost circuit and the positive input terminal of the power amplifier, and wherein the other terminal of the second capacitor is connected between the second output terminal of the boost circuit and the negative input terminal of the power amplifier;
wherein the demodulator is connected between the signal interface and a signal input terminal of the power amplifier, wherein the demodulator is configured to demodulate a signal received by the signal interface into an audio signal, and wherein the power amplifier is configured to form a drive signal by amplifying the audio signal; and
wherein the filtering matched impedance is connected between an output terminal of the power amplifier and the piezoelectric sheet, and wherein the filtering matched impedance is configured to send the drive signal to the piezoelectric sheet after filtering and attenuating the drive signal.

13. The terminal protective case of claim 1, wherein the terminal protective case is disposed in an audio playback system comprising the terminal and the terminal protective case.

14. An audio playback system, comprising:
a terminal, comprising:
a drive circuit; and
a second conductive contact electrically connected to the drive circuit; and
a terminal protective case, the terminal protective case comprising:
a housing, comprising a main body part and a fastening frame part;
a diaphragm;
a piezoelectric sheet; and
a first conductive contact;
wherein a side of the fastening frame part is fastened to a periphery of the main body part, and wherein the fastening frame part and the main body part jointly enclose an accommodating groove;
wherein the diaphragm is located within the main body part, wherein the piezoelectric sheet is fastened to the diaphragm, wherein a front cavity is on a side of the diaphragm, wherein a sound outlet hole is disposed on the main body part, and wherein the sound outlet hole connects the front cavity to the outside of the main body part; and
wherein the first conductive contact is fastened to at least one of the fastening frame part the main body part and projects from the accommodating groove, and wherein the first conductive contact is electrically connected to the piezoelectric sheet; and
wherein the terminal is disposed in the accommodating groove, wherein the second conductive contact abuts the first conductive contact, wherein the drive circuit is configured to convert an audio signal into a drive signal and to transmit the drive signal to the piezoelectric sheet through the second conductive contact and the first conductive contact, wherein transmitting the drive signal to the piezoelectric sheet drives the piezoelectric sheet to cause the diaphragm to vibrate.

15. The audio playback system according to claim 14, wherein the main body part comprises a bottom plate portion, a top plate portion, and a connection portion, wherein the bottom plate portion and the top plate portion are disposed opposite to each other, wherein the connection portion is connected between a periphery of the bottom plate portion and a periphery of the top plate portion, and wherein the fastening frame part is connected to at least one of the bottom plate portion or the connection portion; and wherein the sound outlet hole is disposed on the connection portion.

16. The audio playback system according to claim 15, wherein the bottom plate portion comprises a bottom plate body and a first protrusion, wherein the first protrusion is fastened to a side of the bottom plate body that faces the top plate portion, wherein the top plate portion comprises a top plate body and a second protrusion, wherein the second protrusion is fastened to a side of the top plate body that faces the bottom plate portion, wherein the second protrusion is disposed opposite to the first protrusion, and wherein a periphery of the diaphragm is fastened between the first protrusion and the second protrusion.

17. The audio playback system according to claim 15, wherein the terminal protective case further comprises a first cover body and a second cover body that are located within the main body part, wherein the first cover body and the second cover body are disposed opposite each other, and a periphery of the diaphragm is fastened between the first cover body and the second cover body; and wherein the front cavity is formed between the diaphragm and the first cover body, wherein a connection hole is disposed on the first cover body, wherein the connection hole connects the front cavity and the sound outlet hole, wherein a rear cavity is disposed between the diaphragm and the second cover body, wherein a leakage hole is disposed on the second cover body, and wherein the leakage hole connects the rear cavity to the outside of the second cover body.

18. The audio playback system according to claim 15, wherein the diaphragm and the piezoelectric sheet fastened to the diaphragm jointly form a piezoelectric speaker core, wherein the terminal protective case comprises a plurality of piezoelectric speaker cores, and wherein front cavities of the plurality of piezoelectric speaker cores are respectively connected to a plurality of sound outlet holes in different positions.

* * * * *